(12) United States Patent
Deguchi

(10) Patent No.: US 7,990,946 B2
(45) Date of Patent: Aug. 2, 2011

(54) NODE APPARATUS AND PATH SETUP METHOD

(75) Inventor: Masaki Deguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 112 days.

(21) Appl. No.: 12/379,761

(22) Filed: Feb. 27, 2009

(65) Prior Publication Data

US 2009/0323522 A1    Dec. 31, 2009

(30) Foreign Application Priority Data

Jun. 26, 2008 (JP) ................................ 2008-167506

(51) Int. Cl.
*H04L 12/28* (2006.01)
(52) U.S. Cl. ........................................ 370/351; 370/216
(58) Field of Classification Search .......... 370/216–228, 370/351
See application file for complete search history.

(56) References Cited

U.S. PATENT DOCUMENTS

| | | | | |
|---|---|---|---|---|
| 6,044,064 A | * | 3/2000 | Brimmage et al. | 370/248 |
| 2003/0043745 A1 | * | 3/2003 | Kano et al. | 370/238 |
| 2003/0185148 A1 | | 10/2003 | Shinomiya et al. | |
| 2005/0188242 A1 | * | 8/2005 | Rabbat et al. | 714/4 |

FOREIGN PATENT DOCUMENTS

JP    2003-289325    10/2003

* cited by examiner

*Primary Examiner* — Derrick Ferris
*Assistant Examiner* — Mang Yeung
(74) *Attorney, Agent, or Firm* — Fujitsu Patent Center

(57) ABSTRACT

A node apparatus includes: a control unit setting up a path; a path setup time measuring unit measuring path setup time required to set up the path; a path setup time reporting unit reporting the path setup time to another node apparatus on a communication network; a path setup time storage unit storing the path setup time measured at another node apparatus on the communication network when the measured path setup time is reported from the other node apparatus; and an alternate path determining unit determining a path based on the path setup time of each node apparatus stored in the setup time storage unit.

10 Claims, 27 Drawing Sheets

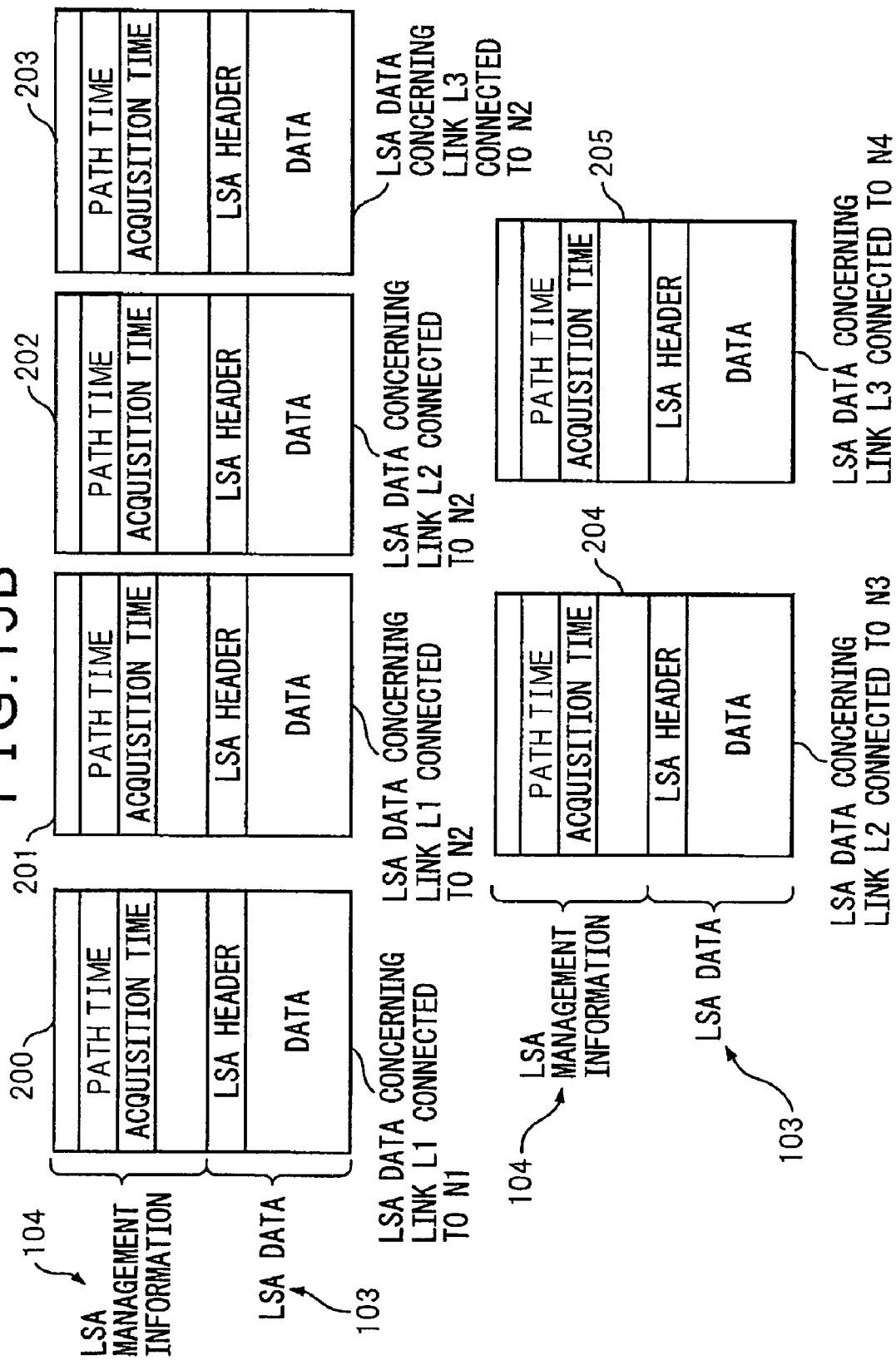

NODE APPARATUS AND PATH SETUP METHOD

CROSS-REFERENCE TO RELATED APPLICATIONS

This application is based upon and claims the benefit of priority of prior Japanese Patent Application No. 2008-167506, filed on Jun. 26, 2008, the entire contents of which are incorporated herein by reference.

FIELD

The present invention relates to a method and apparatus for setting up an alternate path on a communication network in which a path for transferring data is generated by using label switching.

BACKGROUND

In recent years, MPLS (Multi-Protocol Label Switching) that manages network paths by applying label switching to IP (Internet Protocol) networks has come into wide use, and GMPLS (Generalized Multi-Protocol Label Switching) which can be applied not only to IP networks, but also to TDM (Time Division Multiplexing) networks such as SDH (Synchronous Digital Hierarchy)/SONET (Synchronous Optical NETwork) and other networks such as wavelength switched networks, has been commercially implemented. The description given herein deals with a communication network and node apparatus in which paths are set up by using GMPLS, but the invention is not limited to this particular example but can be applied widely to any communication network and node apparatus in which paths are set up by label switching.

FIG. 1 shows a sequence illustrating a path generation (signaling) process for generating a path from the start point node N1 (ingress) of the path to the endpoint node N4 (egress) by using GMPLS. First, the node N1 transmits a path message "PathMsg", i.e., a reservation request message for requesting the reservation of a path setup, to its adjacent intermediate node N2 via a supervisory channel by specifying ERO (Explicit_Route Object), which is information specifying a route up to the endpoint node N4, and a label that the node N1 intends to use between it and the adjacent node N2.

At the node N2, if the label specified by the received PathMsg is not in use, the label is set to a reserved state, and the node N2 forwards the same PathMsg to the next intermediate node N3. The node N3 performs the same processing as the node N2, and forward the PathMsg to the endpoint node N4.

Then, at the node N4, if the path requested by the received PathMsg can be set up, the node N4 returns a reserve message "ResvMsg". The reserve message corresponds to a reservation completed message delivered to notify that the reservation of the path requested by the PathMsg is completed. The ResvMsg is transmitted via the supervisory channel, and after the transmission, the node N4 sets up its own cross connect in order to generate (open) the requested path. The node N3 that received the ResvMsg from the node N4 sets up its own cross connect and forwards the ResvMsg to the node N2. The same processing is performed at the nodes N2 and N1, and the path setup between the node N1 and the node N4 is completed.

FIG. 2 is a diagram showing the data structure of the PathMsg. In the figure, the hatched fields (objects) are required objects, and the others are optional objects. This convention also applies to the data structures hereinafter shown in FIGS. 3, 5, 12, and 26. A brief description of the data carried in the PathMsg is given below.

SESSION, SENDER_TEMPLATE: Fields for storing connection identification information, the connection being made uniquely identifiable by combining five kinds of information (ingress address, egress address, tunnel ID, LSP ID, and extended tunnel ID).

RSVP_HOP: Stores the local ID of the path message PathMsg transmitting node as identification information for the fiber used.

TIME_VALUES: A field for storing path refresh interval (the length of the refresh timer).

EXPLICIT_ROUTE: A field for storing routing information indicating how the connection is to be routed.

LABEL_REQUEST: A field for storing the type of the requested label.

PROTECTION: A field for storing the kind, etc. of the protection that the connection requests.

SESSION_ATTRIBUTE: A field for storing the name of the connection, etc.

ADMIN_STATUS: A field for storing special information such as Admin_Down and Deletion.

SENDER_TSPEC: A field for storing rate information (2.5G, 10G, etc.) that the connection requests.

UPSTREAM_LABEL: A field for storing the reserved label information (information for identifying wavelength).

ALARM_SPEC: A field for storing the kind and time of alarm generation.

NOTIFY_REQUEST: An object used to request the transmission of a NotifyMsg (to be described later) when a failure occurs on the requested path.

FIG. 3 is a diagram showing the data structure of the reserve message (ResvMsg). A brief description of the data carried in the ResvMsg is given below.

RESV_CONFIRM: A field for storing information used when requesting the transmission of a ResvConfMsg.

FLOWSPEC: A field for storing the same connection identification information as that stored in the SENDER_TEMPLATE object carried in the PathMsg.

FILTERSPEC: A field for storing requested rate information, as in the SENDER_TSPEC object carried in the PathMsg.

LABEL: A field for storing label information, as in the UPSTREAM_LABEL object carried in the PathMsg.

ALARM_SPEC: A field for storing the type and time of alarm generation.

NOTIFY_REQUEST: An object used to request the transmission of the NotifyMsg (to be described later) when a failure occurs on the requested path.

If a failure occurs on the path set up by GMPLS, notification of the occurrence of the failure and control for switching can be accomplished by transmitting the hereinafter described failure notification message "NotifyMsg" to the node requesting the transmission of the failure notification among the nodes located along the end-to-end path. Further, by using the ALARM_SPEC object, each node located along the end-to-end path can be notified of the occurrence of the failure. FIG. 4 is a sequence diagram showing how a node that detected the occurrence of a failure transmits the NotifyMsg.

When a failure occurs on the path set up by GMPLS, the node N3 that detected the failure transmits the NotifyMsg indicating the occurrence of the failure on the path, to the node (in the illustrated example, the start point node N1) that requested the NotifyMsg by using the NOTIFY_REQUEST object. The start point node N1 that received the NotifyMsg performs processing such as failure recovery (switching), for example, by setting up a path along a new route (a protection path) so as to circumvent the location of the failure.

FIG. 5 is a diagram showing the data structure of the NotifyMsg. A brief description of the data carried in the NotifyMsg is given below.

ERROR_SPEC: A field for storing information concerning the location of the failure.

The NotifyMsg also carries the SESSION and SENDER_TEMPLATE objects similar to the SESSION and SENDER_TEMPLATE objects carried in the PathMsg, and the path affected by the failure can be identified using these objects.

In the prior art, failure recovery has been accomplished in one of two ways, i.e., an alternate path (protection path) is computed upon detecting the occurrence of a failure, and the computed path is set up as the new path, or alternatively, the protection path is set up in advance, and upon detecting the occurrence of a failure, switching is made to the protection path.

Japanese Laid-open Patent Publication No. 2003-289325 discloses an alternate path design method for a communication network, in which a node that detected a failure forwards a failure notification message containing the failure location information to each of the other nodes, and the nodes that received the failure notification message switch the path in parallel fashion. In this alternate path design method, a first alternate path provided by the initial design is selected, failure notification time is computed for a node, among the nodes on the first alternate path, that requires the longest time to receive the notification from the failure detecting node, a search is made for a second alternate path that is different from the first alternate path, and the second alternate path is checked whether it can share reserve communication resources in the event of other failure; if this condition is satisfied, the longest failure notification time among the nodes on the second alternate path is compared with that on the first alternate path, and if the time required along the second alternate path is shorter, the alternate path is updated to the second alternate path, and the alternate path routing information in the database is updated accordingly.

SUMMARY

According to the apparatus and method disclosed herein, when setting up a path, the path setup time required to set up the path is measured at each node apparatus on a communication network, the path setup time is reported to other node apparatus on the communication network, the path setup time measured at each of the other node apparatus is stored when the measured path setup time is reported, and a path that can be set up with the shortest path setup time is determined based on the path setup time of each node apparatus that has been stored in advance.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTIONS OF THE DRAWINGS

The present invention will be more clearly understood from the description as set below with reference to the accompanying drawings, wherein:

FIG. 15B is a diagram showing an example of the LSA management table corresponding to the network depicted in FIG. 15A.

DESCRIPTION OF EMBODIMENT(S)

In the method that computes the alternate path after the occurrence of a failure, the switching time is defined as the time taken from the moment the occurrence of the failure is detected to the moment the setup of the new alternate path is completed. Among others, the time required to set up the path at each node (for example, the time required to set up the cross connect, hereinafter referred to as the "path setup time") greatly differs from one node apparatus to another depending on the processing capability and load conditions of the node. If an apparatus having a large load or a low processing capability is selected as a relay node, it may take too much time to complete the path setup, and thus the switching time may become longer. On the other hand, the method that sets up the alternate path in advance has had the problem that the cost increases because the required bandwidth increases.

Figure 1:
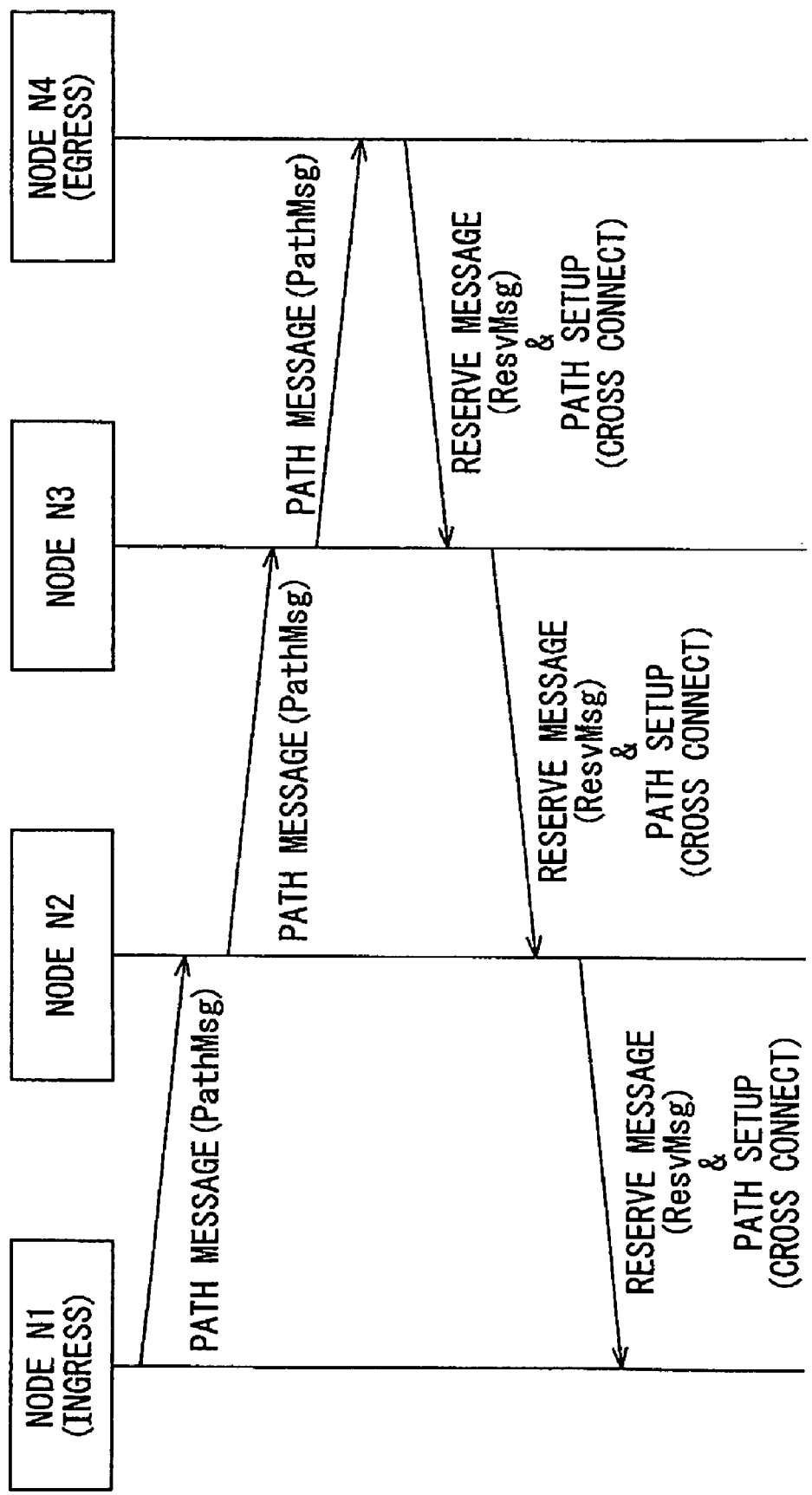
FIG. 1 is a sequence diagram illustrating a path generation process according to GMPLS.
Figure 2:
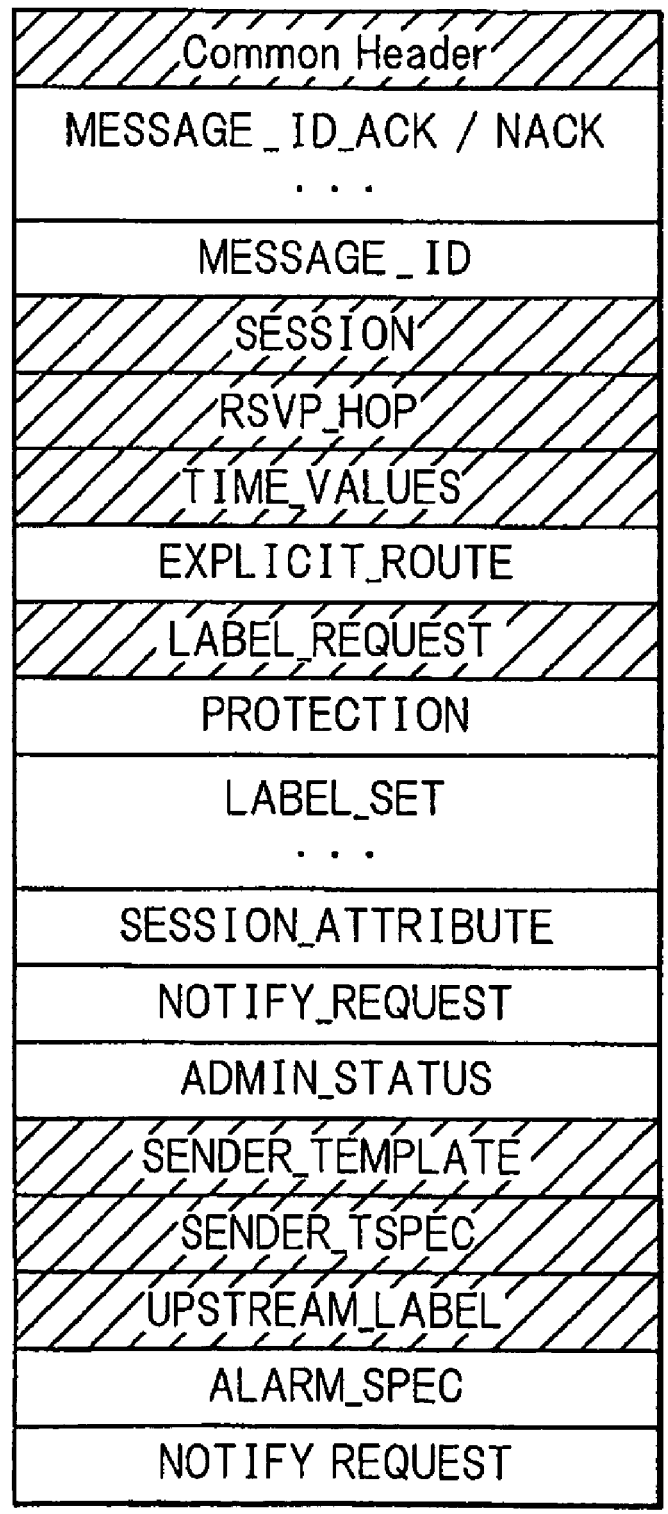
FIG. 2 is a diagram showing the data structure of a path message (PathMsg)
Figure 3:
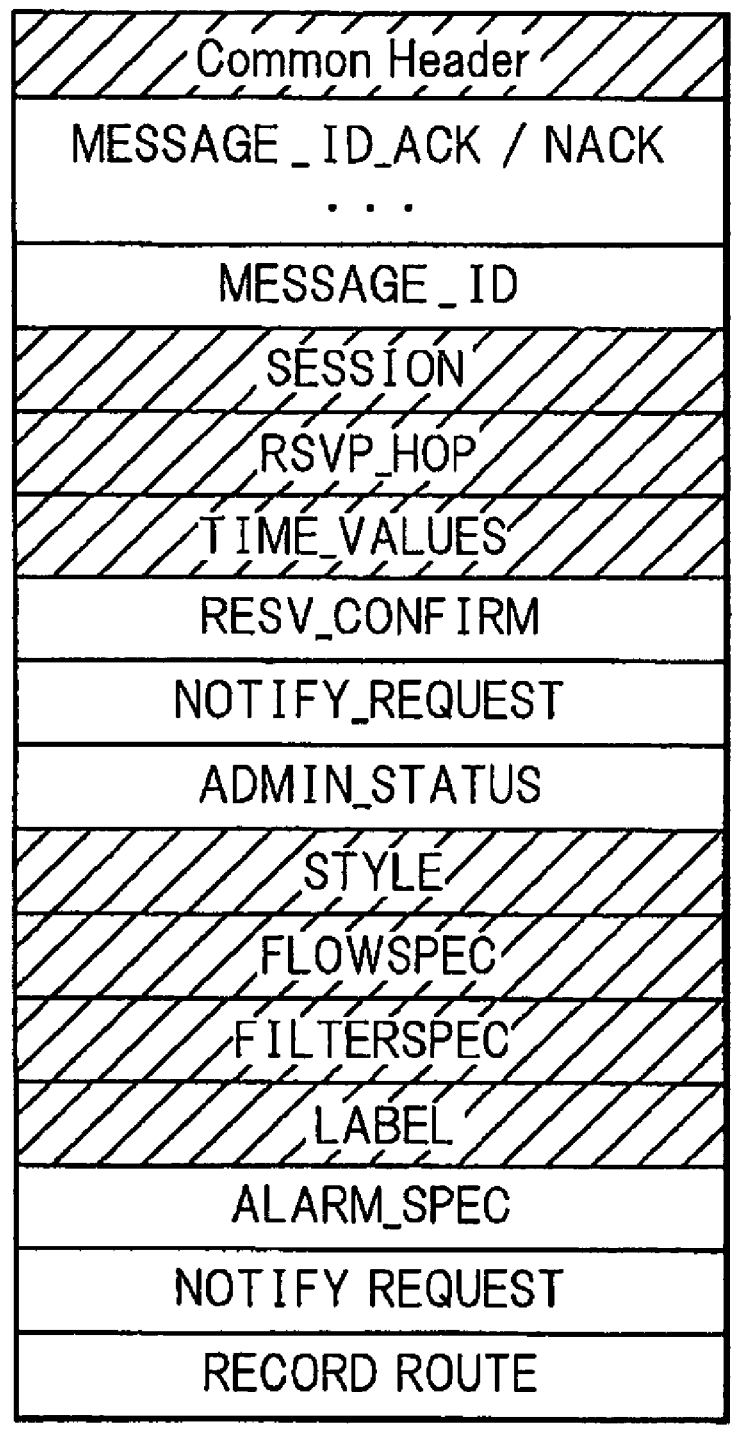
FIG. 3 is a diagram showing the data structure of a reserve message (ResvMsg)
Figure 4:
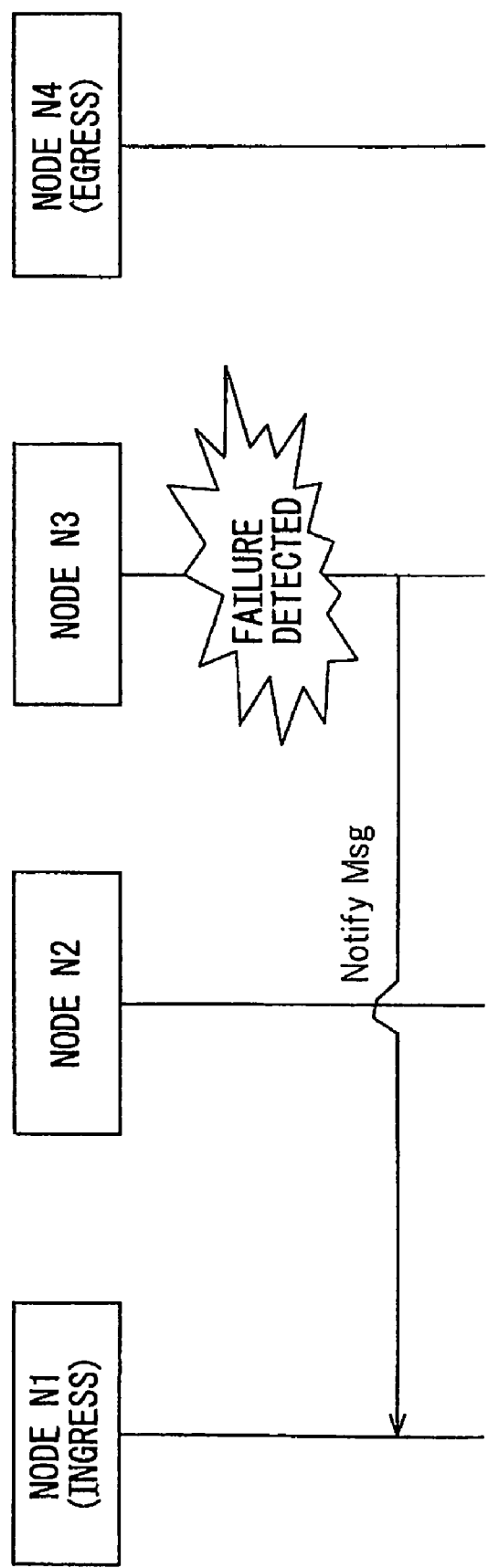
FIG. 4 is a sequence diagram showing how a node that detected a failure transmits a failure notification message.
Figure 5:
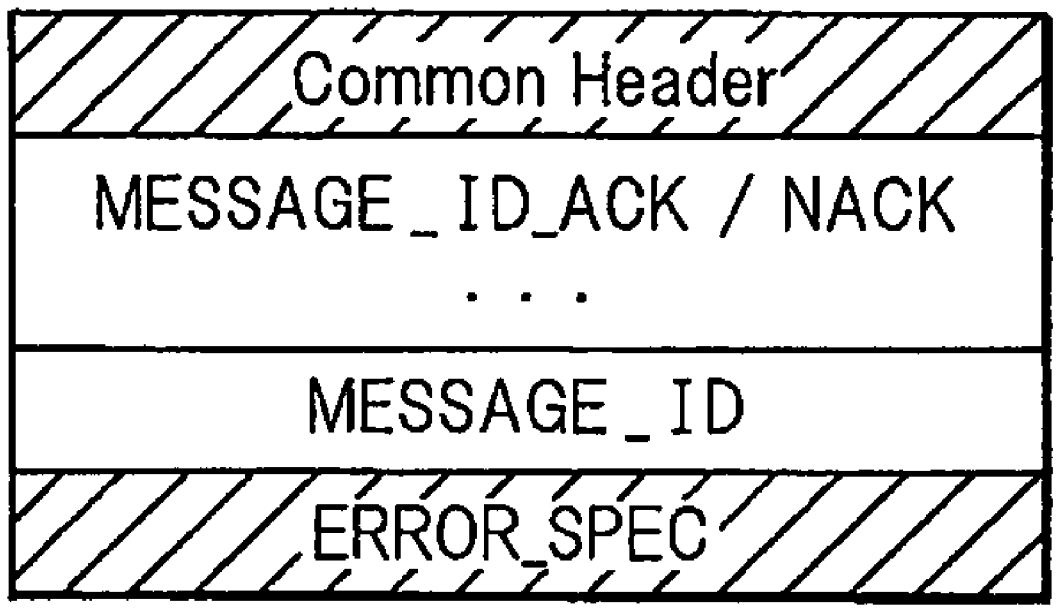
FIG. 5 is a diagram showing the data structure of a failure notification message (NotifyMsg)
Figure 6:
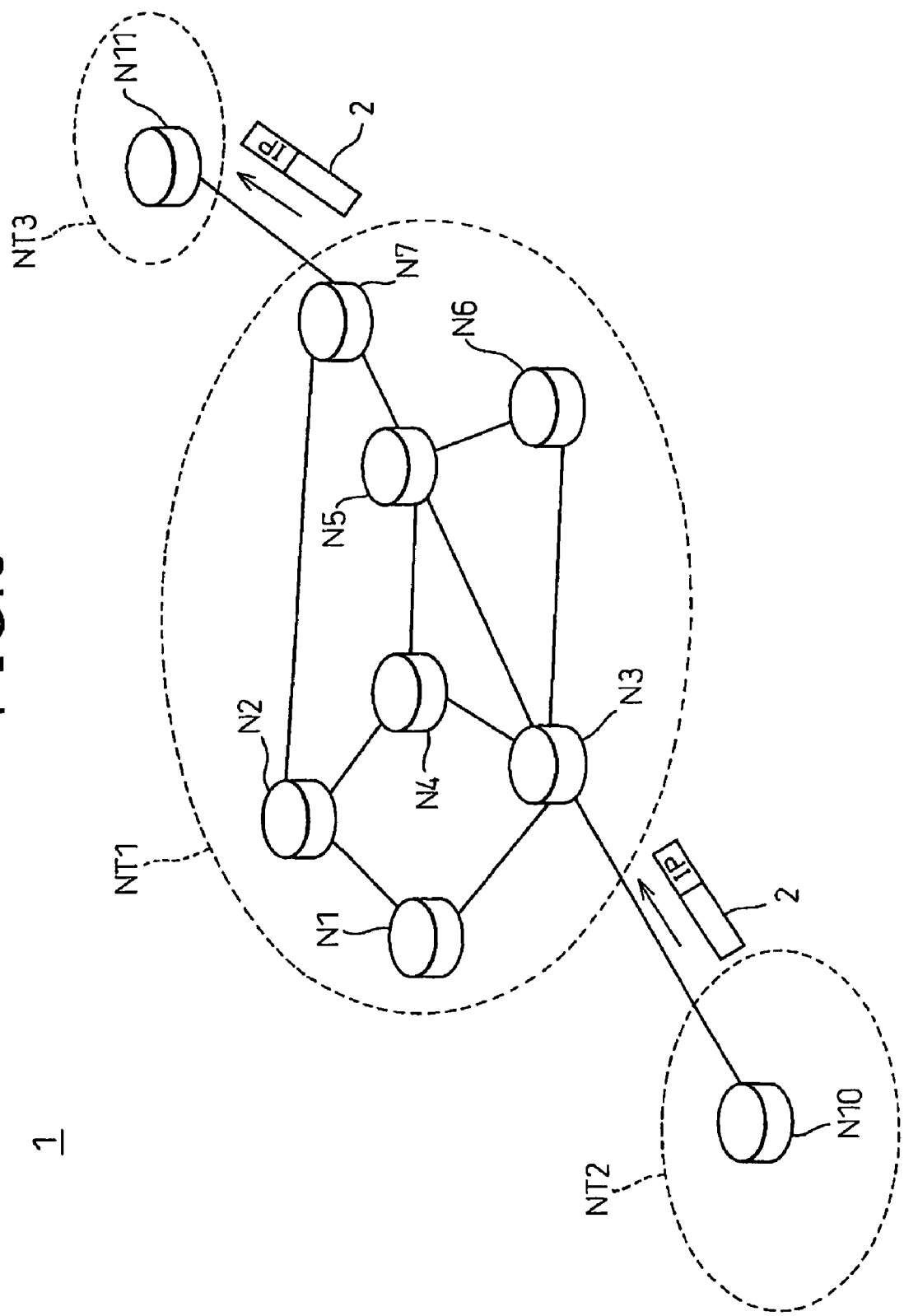
FIG. 6 is a simplified diagram showing the configuration of a communication system disclosed herein.

Embodiments will be described below with reference to the accompanying drawings. FIG. 6 is a simplified diagram showing the configuration of a communication system disclosed herein. The communication system 1 shown here includes communication networks NT1 to NT3, of which NT1 is a label switching network in which paths are generated by using GMPLS or MPLS.

When a packet 2 sent from a node N10 in another network NT2 is received at a node N1 in the label switching network NT1, a label is attached to the packet 2 in accordance with its destination IP address. Thereafter, the packet is forwarded, by referring only to the label, from one node to another until it reaches an ingress node N7 which connects to a node N11 in the destination network NT3.

The following description is given on the assumption that the communication network NT1 and the nodes N1 to N7 perform path setup using GMPLS, but the system disclosed herein is not limited to this particular example. The disclosed system is widely applicable to any communication network and node apparatus in which paths are set up by label switching, and such applications also fall within the scope of the disclosed system.

Figure 7:
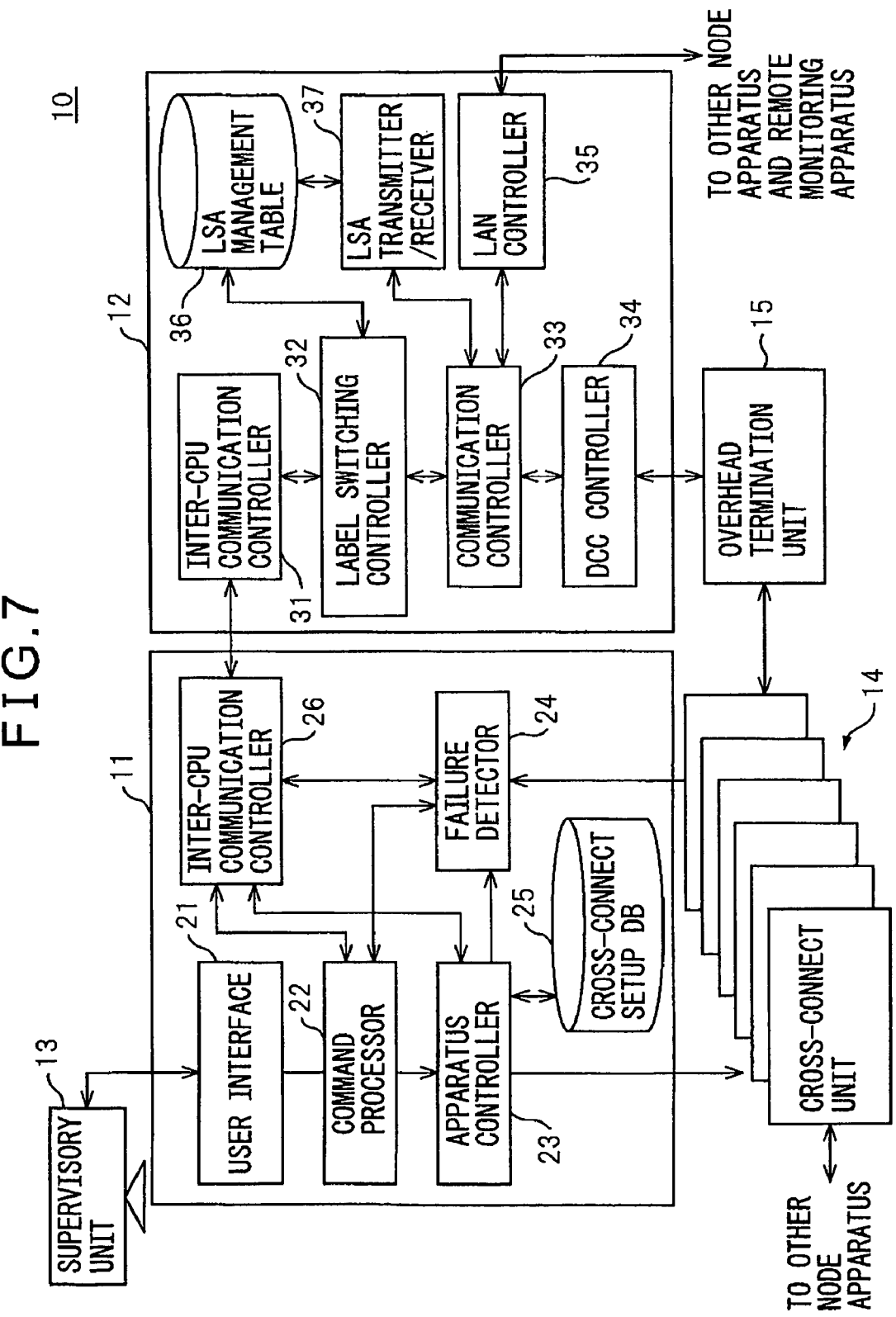
FIG. 7 is a simplified diagram showing the configuration of a node apparatus disclosed herein.

FIG. 7 is a simplified diagram showing the configuration of a node apparatus constituting each of the nodes N1 to N7 in the network NT1. The node apparatus 10 includes an apparatus control unit 11, a communication control unit 12, a supervisory apparatus 13 connected to the apparatus control unit 11, a cross-connect unit 14, connected to the apparatus control unit 11, for performing optical-to-electrical signal conversion and switching operations, and an SDH/SONET overhead termination unit 15 connected between the communication control unit 12 and the cross-connect unit 14.

The apparatus control unit 11 processes an optical main signal, and the communication control unit 12 processes a path message (PathMsg), reserve message (ResvMsg), failure notification message (NotifyMsg), etc. that flow over a supervisory channel.

The apparatus control unit 11 includes a user interface 21 connected to the supervisory apparatus 13, a command processor 22 connected to the user interface 21, an apparatus controller 23 and failure detector 24 connected to the cross-connect unit 14, a cross-connect setup database 25 for storing information concerning the cross-connect setup state in the node apparatus, and an inter-CPU communication controller 26 interconnected with the command processor 22 and failure detector 24. The apparatus controller 23 and failure detector 24 are interconnected with each other, so are the command processor 22 and failure detector 24.

The communication control unit 12 includes an inter-CPU communication controller 31 interconnected with the inter-CPU communication controller 26 in the apparatus control unit 11, a label switching controller 32 connected to the inter-CPU communication controller 31, a communication controller 33 connected to the label switching controller 32, a data communication channel (DCC) controller 34, connected between the communication controller 33 and the overhead termination unit 15, for controlling a data communication channel (DCC), a LAN controller 35, connected to the communication controller 33, for controlling communication with other node apparatus and remote monitoring apparatus via a LAN, an LSA management table 36 which contains link state advertising (LSA) information as topology information of the communication network NT1, and an LSA transmitter/receiver 37 for exchanging the LSA data contained in the LSA management table 36 with other node apparatus in the communication network NT1.

Figure 8:
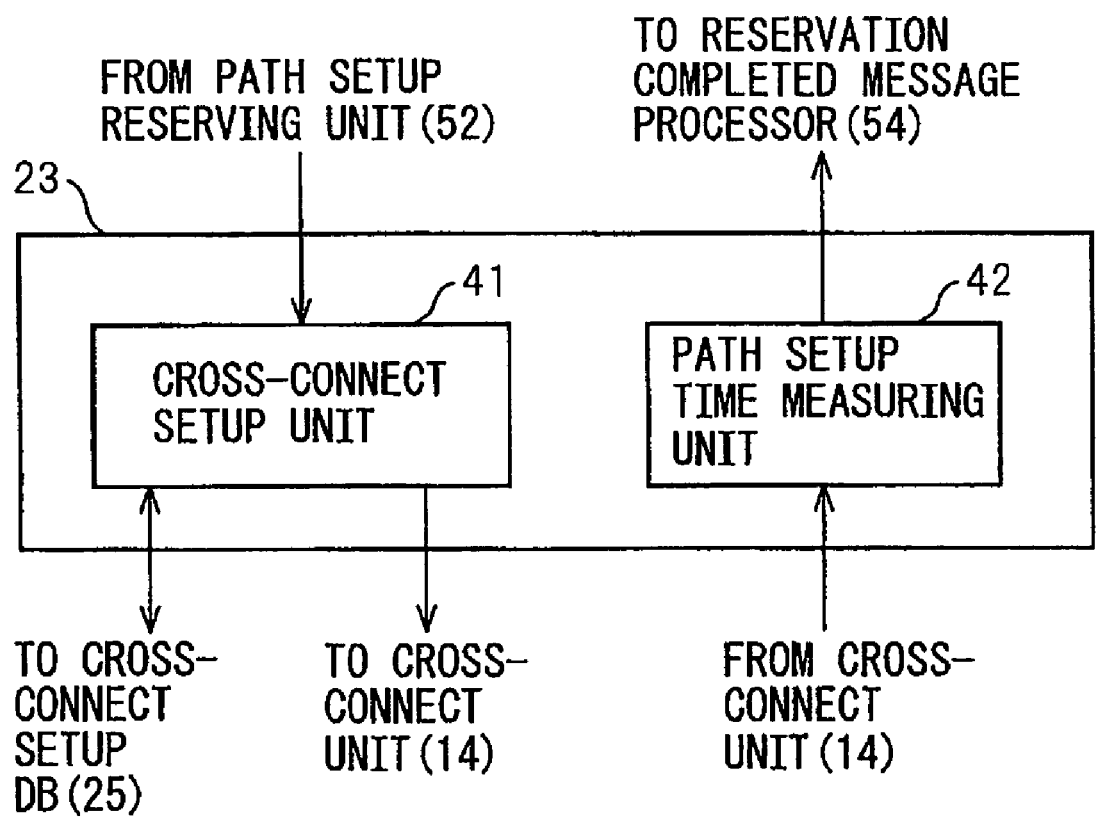
FIG. 8 is a simplified diagram showing the configuration of an apparatus controller depicted in FIG. 7.

FIG. 8 is a simplified diagram showing the configuration of the apparatus controller 23 depicted in FIG. 7. The apparatus controller 23 includes a cross-connect setup unit 41 which sets up the cross-connect unit 14 in accordance with a cross-connect setup instruction for a cross-connect within the node apparatus 10, issued from a path setup reserving unit 52 in the label switching controller 32 as will be described later, and a path setup time measuring unit 42 which measures path setup time representing the time required to set up the cross-connect unit 14.

The path setup time measuring unit 42 may output the cross-connect setup time as the path setup time each time the setup of the cross-connect unit 14 is done, or may store a history of path setup times and may output as the path setup time a path setup time averaged over a plurality of cross-connect setups.

Figure 9:
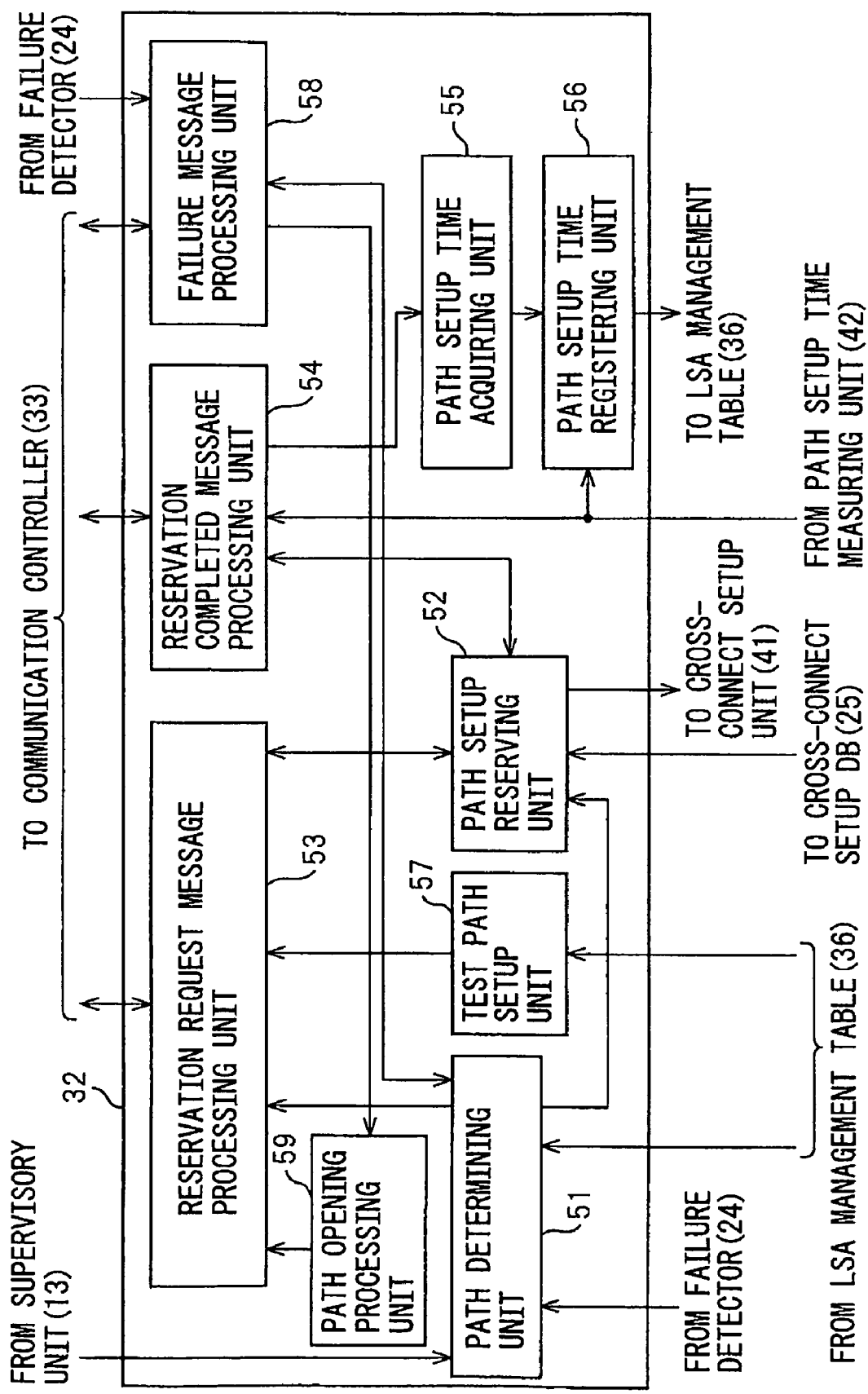
FIG. 9 is a simplified diagram showing the configuration of a label switching controller depicted in FIG. 7.

FIG. 9 is a simplified diagram showing the configuration of the label switching controller 32 depicted in FIG. 7. The label switching controller 32 includes, in addition to the path setup reserving unit 52, a path determining unit 51, a reservation request message processing unit 53, a reservation completed message processing unit 54, a path setup time acquiring unit 55, a path setup time registering unit 56, a test path setup unit 57, a failure message processing unit 58, and a path opening processing unit 59.

When a path setup request is received from a user via the supervisory apparatus 13, the path determining unit 51 determines the route for the requested path, based on the topology information of the communication network NT1 stored in the LSA management information table 36.

Further, when a notification indicating the occurrence of a failure on an already established path is received from the failure detector 24, the path determining unit 51 determines an alternate path so as to circumvent the failed part of the path on which the failure was detected.

When a NotifyMsg indicating the occurrence of a failure is received by the failure message processing unit 58 from another node apparatus that detected the path failure, if the NotifyMsg does not contain alternate path routing information, the path determining unit 51 determines an alternate path so as to circumvent the failed part of the path on which the failure was detected.

The path setup reserving unit 52 reserves the cross-connect setup to be performed in the node apparatus 10 in order to open the path determined by the path determining unit 51.

Further, the path setup reserving unit 52 reserves the cross-connect setup to be performed in the node apparatus 10 in order to open the path specified by the PathMsg that the reservation request message processing unit 53 received from another node apparatus upstream of the requested path. Cross-connect setup reservation information is registered into the cross-connect setup DB 25.

When a ResvMsg is received from a downstream node apparatus for the reserved path, the path setup reserving unit 52 instructs the cross-connect setup unit 41 to set up the reserved cross connect.

The reservation request message processing unit 53 performs processing for the transmission and reception of the PathMsg in accordance with GMPLS. The PathMsg is transmitted to or received from an adjacent node via the communication controller 33 and the LAN controller 35 or the DCC controller 34.

The reservation request message processing unit 53 generates the PathMsg for opening the path specified by the path determining unit 51, the test path setup unit 57, or the path opening processing unit 59, and transmits it to the downstream node apparatus.

When the PathMsg is received from the upstream node apparatus, the reservation request message processing unit 53 instructs the path setup reserving unit 52 to reserve the cross-connect setup in the node apparatus 10 in order to open the path requested by the received PathMsg and, if the cross-connect setup can be reserved, forwards the same PathMsg to the downstream node apparatus.

The reservation completed message processing unit 54 performs processing for the transmission and reception of the ResvMsg in accordance with GMPLS. The ResvMsg is transmitted to or received from an adjacent node via the communication controller 33 and the LAN controller 35 or the DCC controller 34. When the ResvMsg is received from the downstream node apparatus, the reservation completed message processing unit 54 instructs the path setup reserving unit 52 to set up the cross connect in the node apparatus 10 in order to open the path requested by the received ResvMsg.

When the cross-connect setup is completed by the path setup reserving unit 52, the reservation completed message processing unit 54 acquires from the path setup time measuring unit 42 the path setup time required to set up the cross connect, appends it to the path setup time information contained in the ResvMsg received from the downstream node apparatus, and transmits the resulting ResvMsg to the upstream node apparatus.

The path setup time acquiring unit 55 acquires the path setup time information contained in the ResvMsg that the reservation completed message processing unit 54 received from the downstream node apparatus, and supplies it to the path setup time registering unit 56.

The path setup time registering unit 56 registers the path setup time of the current node apparatus 1 measured by the path setup time measuring unit 42 into the LSA management table 36 along with the path setup times of other node apparatus acquired by the path setup time acquiring unit 55.

In order to receive the ResvMsg containing the path setup time measured at a designated node apparatus registered in the topology information stored in the LSA management table 36, the test path setup unit 57 sets up a test path containing the designated node apparatus.

The failure message processing unit 58 performs processing for the transmission and reception of the NotifyMsg in accordance with GMPLS. The NotifyMsg is transmitted to or received from an adjacent node via the communication controller 33 and the LAN controller 35 or the DCC controller 34. When a notification indicating the occurrence of a failure on an already established path is received from the failure detector 24, the failure message processing unit 58 generates the NotifyMsg indicating the occurrence of the failure and transmits it to other nodes. As will be described later, the failure message processing unit 58 may transmit the NotifyMsg by including therein the routing information concerning the alternate path determined by the path determining unit 51.

When the NotifyMsg is received from another node apparatus, the failure message processing unit 58 notifies the path determining unit 51 accordingly.

When a NotifyMsg indicating the occurrence of a failure is received by the failure message processing unit 58 from another node apparatus that detected the path failure, if the NotifyMsg contains alternate path routing information, the path opening processing unit 59 performs path opening processing for the alternate path by instructing the reservation request message processing unit 53 to generate the PathMsg for setting up the path in accordance with the alternate path routing information.

Figure 10:
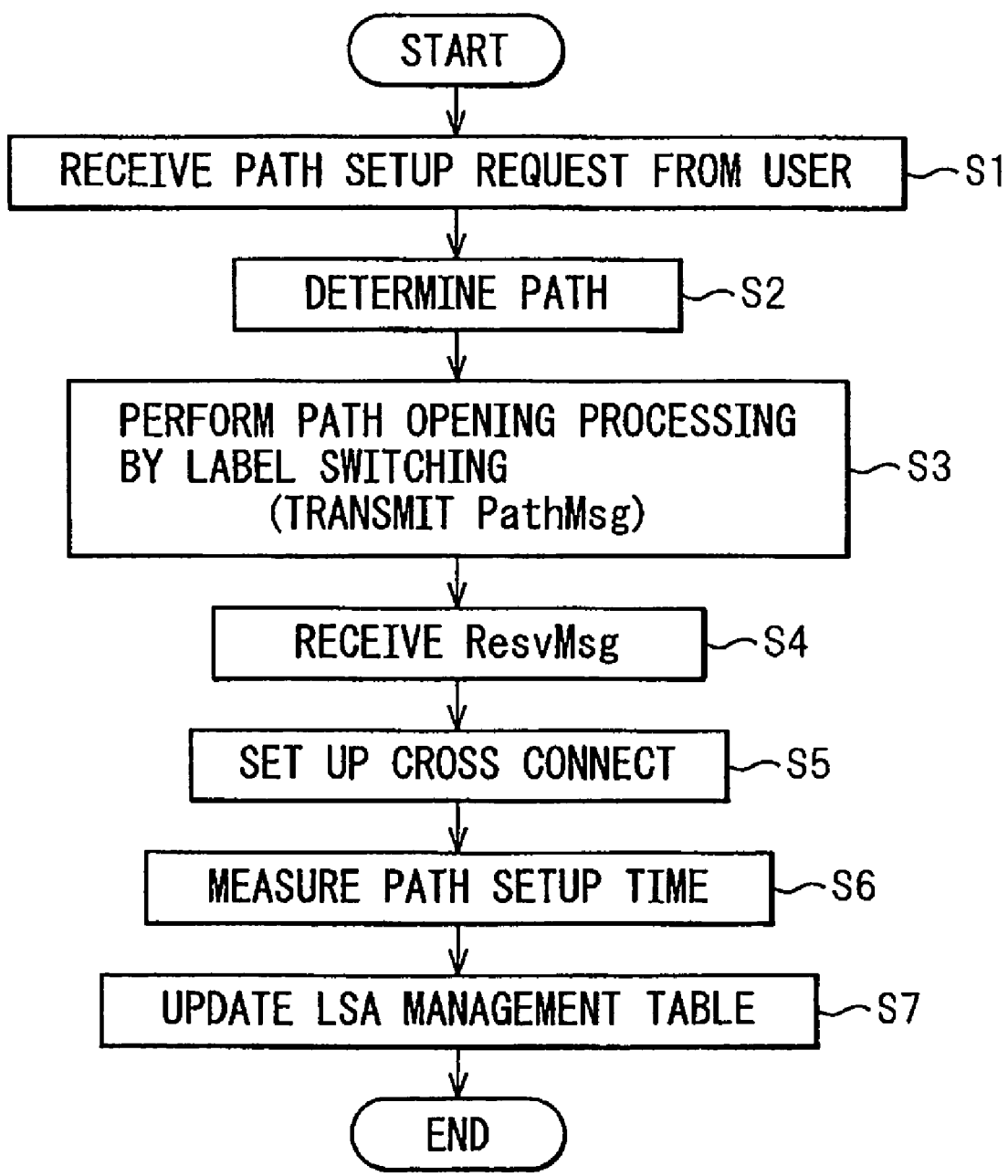
FIG. 10 is a flowchart illustrating path setup processing at a start point node.

FIG. 10 is a flowchart illustrating the path setup processing at the start point node. In step S1, a request to set up a path in accordance with GMPLS is received from a user via the supervisory apparatus 13. The path setup request is transferred via the user interface 21, the command processor 22, and the inter-CPU communication controllers 26 and 31 to the path determining unit 51 in the label switching controller 32.

In step S2, the path determining unit 51 determines the route for the requested path, based on the topology information of the communication network NT1 stored in the LSA management information table 36.

In step S3, the reservation request message processing unit 53, in accordance with the GMPLS path opening processing, generates the PathMsg for opening the path determined by the path determining unit 51 and forwards it to the downstream node apparatus. At this time, the path setup reserving unit 52 reserves the cross-connect setup to be performed in the node apparatus 10 in order to open the path determined by the path determining unit 51.

Figure 11:
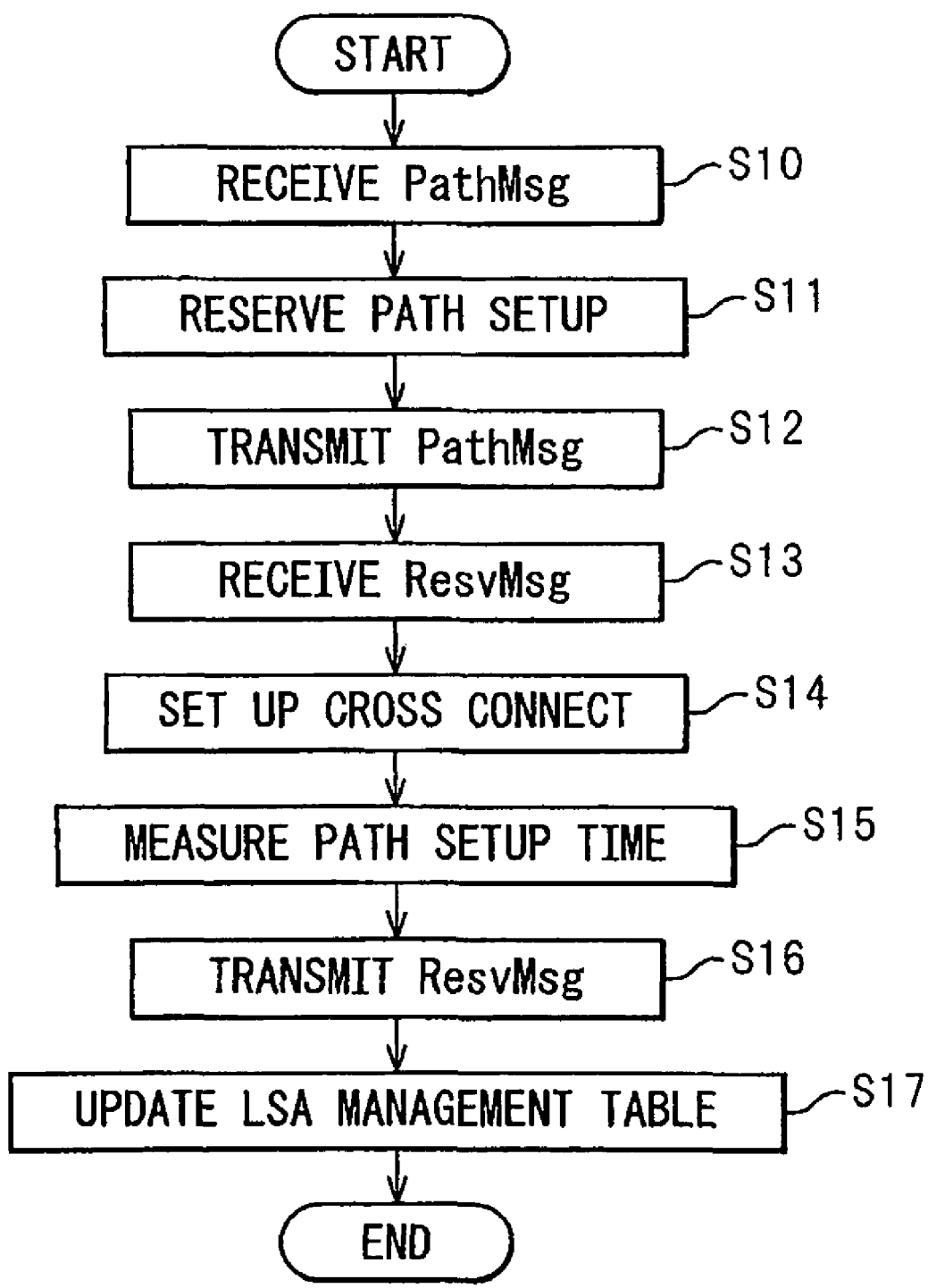
FIG. 11 is a flowchart illustrating path setup processing at an intermediate node or an endpoint node.

FIG. 11 is a flowchart illustrating the path setup processing at an intermediate node located partway down the path or at the endpoint node. In step S10, the reservation request message processing unit 53 in the intermediate or endpoint node receives the PathMsg from its upstream node.

In the case of the endpoint node, the subsequent steps S11 to S13 are skipped, and the process jumps to step S14 where the path setup reserving unit 52 and the cross-connect setup unit 41 perform processing to set up the cross connect in the node apparatus 10 in order to open the path specified by the PathMsg.

On the other hand, in the case of the intermediate node, the process proceeds to step S11 where the path setup reserving unit 52 reserves the cross-connect setup reserves the cross-connect setup to be performed in the node apparatus 10 in order to open the path specified by the PathMsg.

Then, in step S12, the reservation request message processing unit 53 forwards the same PathMsg to the downstream node apparatus, and in step S13, the reservation completed message processing unit 54 receives the ResvMsg returned in response to the PathMsg. In step S14, the path setup reserving unit 52 and the cross-connect setup unit 41 perform processing to set up the cross connect reserved in step S11.

In step S15, the path setup time measuring unit 42 in the apparatus controller 23 measures the path setup time required to set up the cross connect in step S14. The path setup time measuring unit 42 may take as the path setup time the time measured when performing the reserved cross-connect setup, or may store a history of path setup times measured over a plurality of cross-connect setups and may output the average time as the path setup time.

Figure 12:
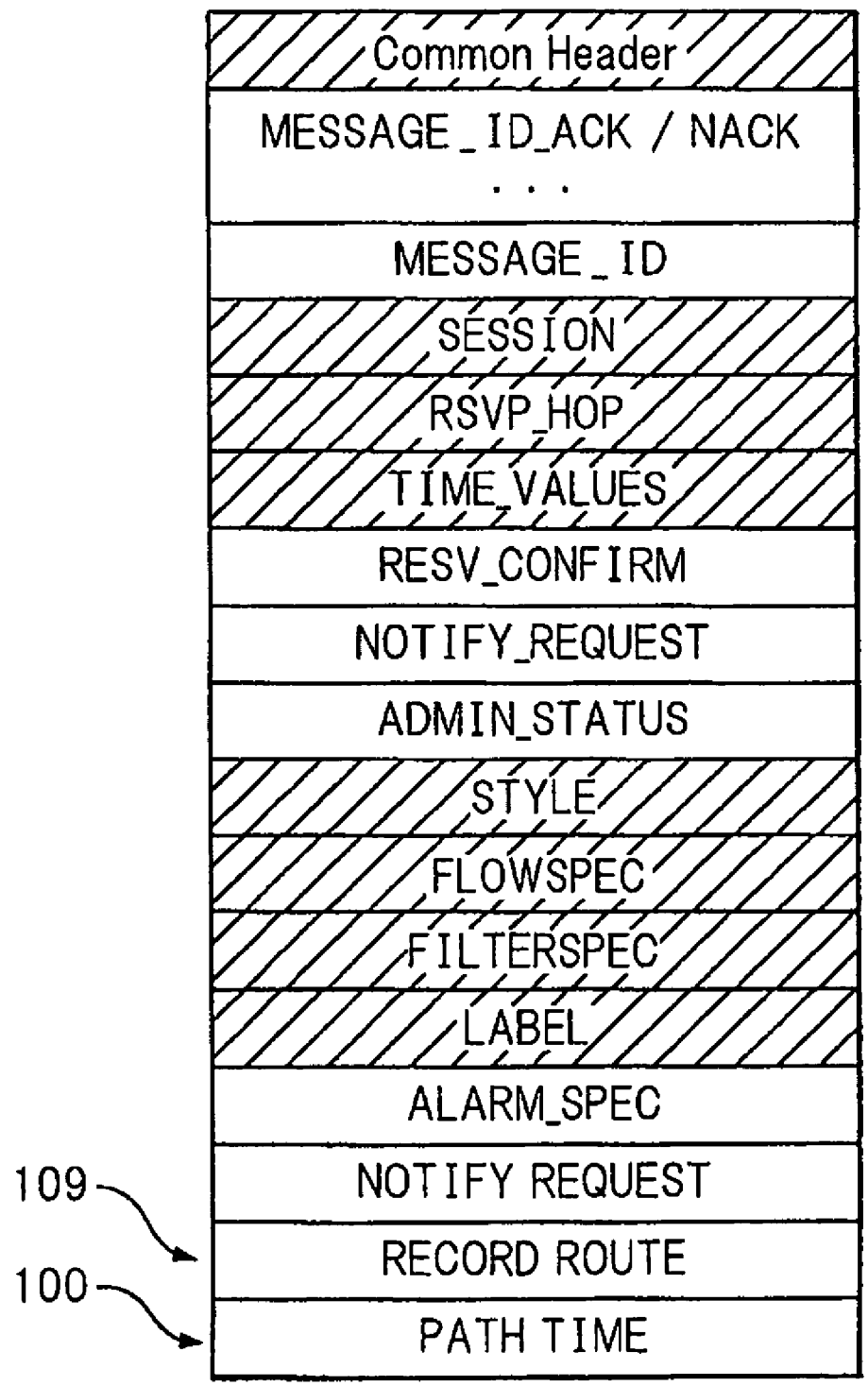
FIG. 12 is a diagram showing the data structure of a reserve message (ResvMsg) used in the disclosed system.
Figure 13:
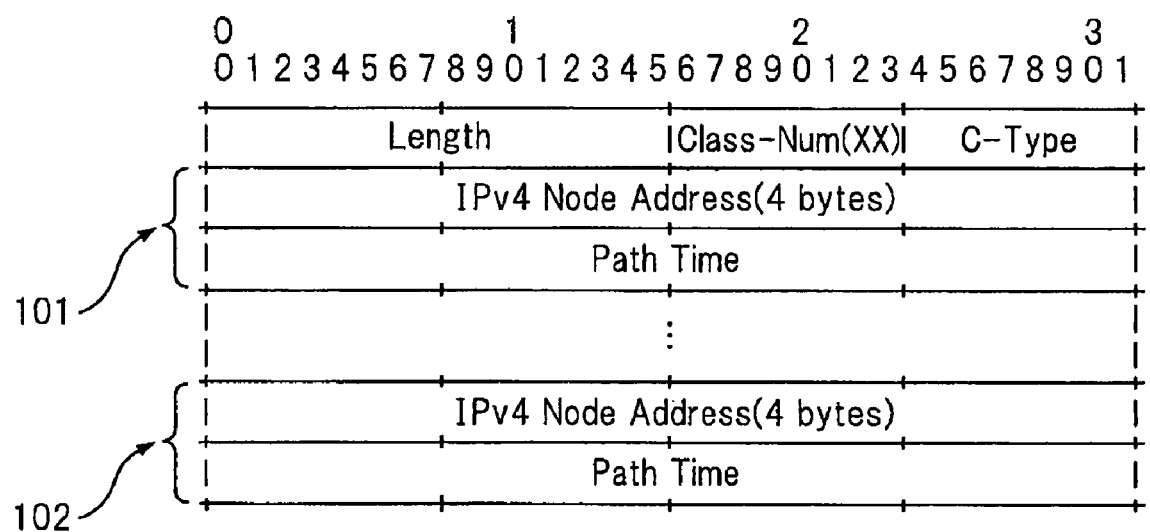
FIG. 13 is a diagram showing the data structure of a PATH TIME object depicted in FIG. 12.

In step S16, the reservation completed message processing unit 54 acquires the path setup time information output from the path setup time measuring unit 42, stores the path setup time in the ResvMsg, and forwards it to the upstream node. FIG. 12 is a diagram showing the data structure of the ResvMsg used in the disclosed system. As depicted in FIG. 12, a PATH TIME object 100 for storing the path setup time is attached. FIG. 13 is a diagram showing the data structure of the PATH TIME object 100 depicted in FIG. 12. The PATH TIME object 100 contains data units 101 and 102 each having a Path Time field indicating the path setup time and a Node Address field identifying the node at which the path setup time was measured.

Figure 14:
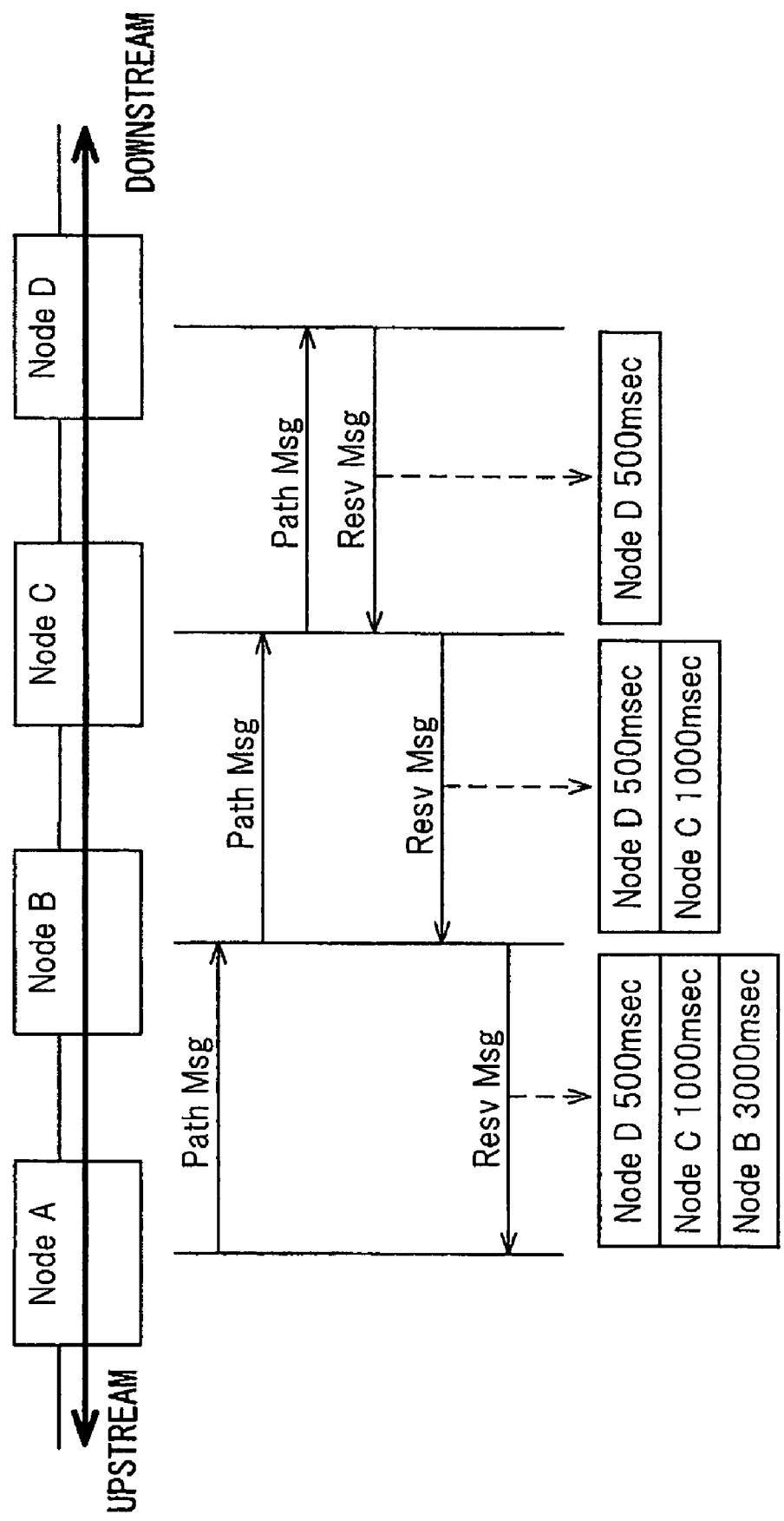
FIG. 14 is a diagram how the path setup times measured at a plurality of nodes are stored one after another in the Resv Msg.

When setting up a path passing through a plurality of nodes, each downstream node transmits the ResvMsg to its adjacent upstream node in step S16, and the upstream node receives the ResvMsg in step S13 and forwards it to the further upstream node in step S16; thus, the ResvMsg is forwarded from one node to another in the upstream direction. This is shown in FIG. 14. The illustrated example assumes the case where a path is set up from the start point node designated as Node A to the endpoint node designated as Node D by passing through intermediate nodes designated as Node B and Node C. As shown, the ResvMsg is forwarded from Node D to Node C to Node B and then to Node A in the upstream direction.

In step S16 shown in FIG. 11, the reservation completed message processing unit 54 adds, in the PATH TIME object carried in the ResvMsg received from its downstream node, the Path Time field indicating the path setup time measured at the current node and the Node Address field identifying the node at which the path setup time was measured; in this way, as the ResvMsg is forwarded downstream along the path, the path setup time of each node is sequentially concatenated in the PATH TIME object.

In the example of FIG. 14, the ResvMsg forwarded from Node D to Node C contains only the path setup time of Node D; then, the path setup times of Node D and Node C are concatenated in the ResvMsg to be forwarded from Node C to Node B, and the path setup times of Node D, Node C, and Node B are concatenated in the ResvMsg to be forwarded from Node B to Node A.

Accordingly, the PATH TIME object may contain a plurality of data units 101 and 102 respectively containing the path setup times measured at different node apparatus, as depicted in FIG. 13.

In step S17 of FIG. 11, the path setup time registering unit 56 searches the LSA management table 36 to retrieve link information concerning the link(s) to which the current node is connected, and registers the path setup time of the current node apparatus 1 measured by the path setup time measuring unit 42 into the retrieved link information.

Further, based on the address information of other node apparatus whose path setup times have been acquired from the ResvMsg by the path setup time acquiring unit 55, the path setup time registering unit 56 searches the LSA management table 36 to retrieve link information associated with these other nodes, and registers the path setup times measured at the respective nodes into the retrieved link information associated with the respective nodes.

Figure 15A:
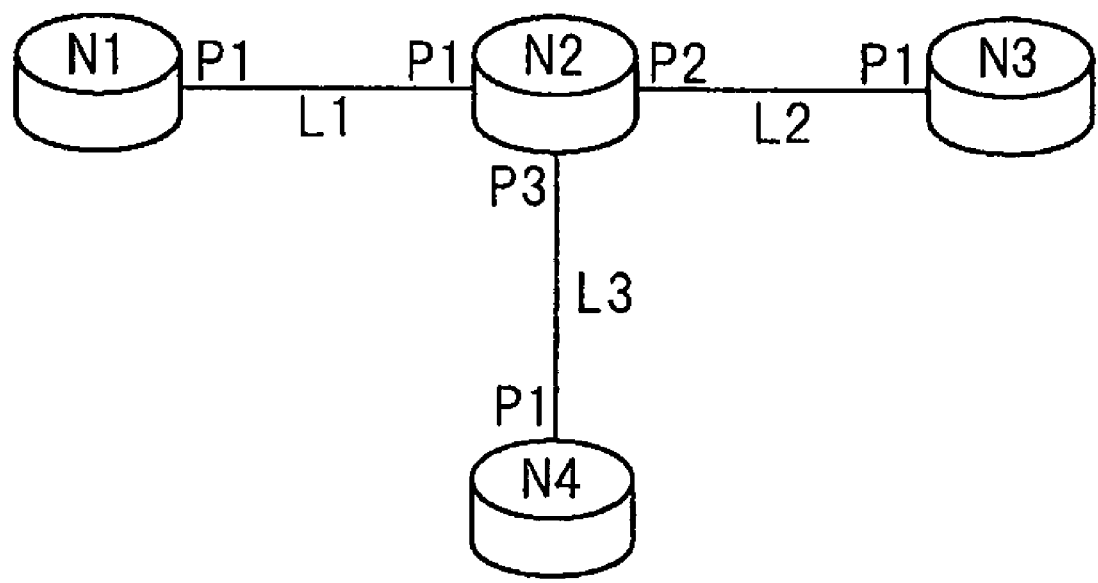
FIG. 15A is a diagram showing a configuration example of a network used for explaining an LSA management table.

A method for registering the path setup times into the LSA management table 36 will be described below with reference to FIGS. 15A, 15B, 16A, 16B and 17. FIG. 15A is a diagram showing a configuration example of a network used for explaining the LSA management table 36, and FIG. 15B is a diagram showing an example of the LSA management table 36 corresponding to the network depicted in FIG. 15A.

The network depicted in FIG. 15A includes four nodes N1 to N4, of which the nodes N1 and N2 are connected by a link L1, and the nodes N2 and N3 are connected by a link L2, while the nodes N2 and N4 are connected by a link L3. An interface P1 of the node N1 is connected to the link L1, and interfaces P1 to P3 of the node N2 are connected to the links L1 to L3, respectively, while the interface P1 of the node N3 is connected to the link L2, and the interface P1 of the node N4 is connected to the link L3.

As depicted in FIG. 15B, the link information stored in the LSA management table 36 includes LSA data proper 103 and LSA management information 104 for managing the LSA data, and the LSA data 103 is created for each of the nodes N1 to N4 and for each of the links connected to the nodes. For example, data 200 includes the LSA data concerning the link L1 connected to the node N1 and the LSA management information for managing the LSA data; data 201 to 203 include the LSA data concerning the links L1 to L3 connected to the node N2 and the LSA management information for managing the LSA data; data 204 includes the LSA data concerning the link L2 connected to the node N3 and the LSA management information for managing the LSA data; and data 205 includes the LSA data concerning the link L3 connected to the node N4 and the LSA management information for managing the LSA data. All the data sets 201 to 205 including the LSA data and the LSA management information are stored at each of the nodes N1 to N4.

In the example of the LSA management table 36 depicted in FIG. 15B, the path setup time registering unit 56 registers the path setup time measured at each of the nodes N1 to N4 and its acquisition time into the LSA management information 104 provided for each of the links connected to the respective nodes.

Figures 16A, 16B:
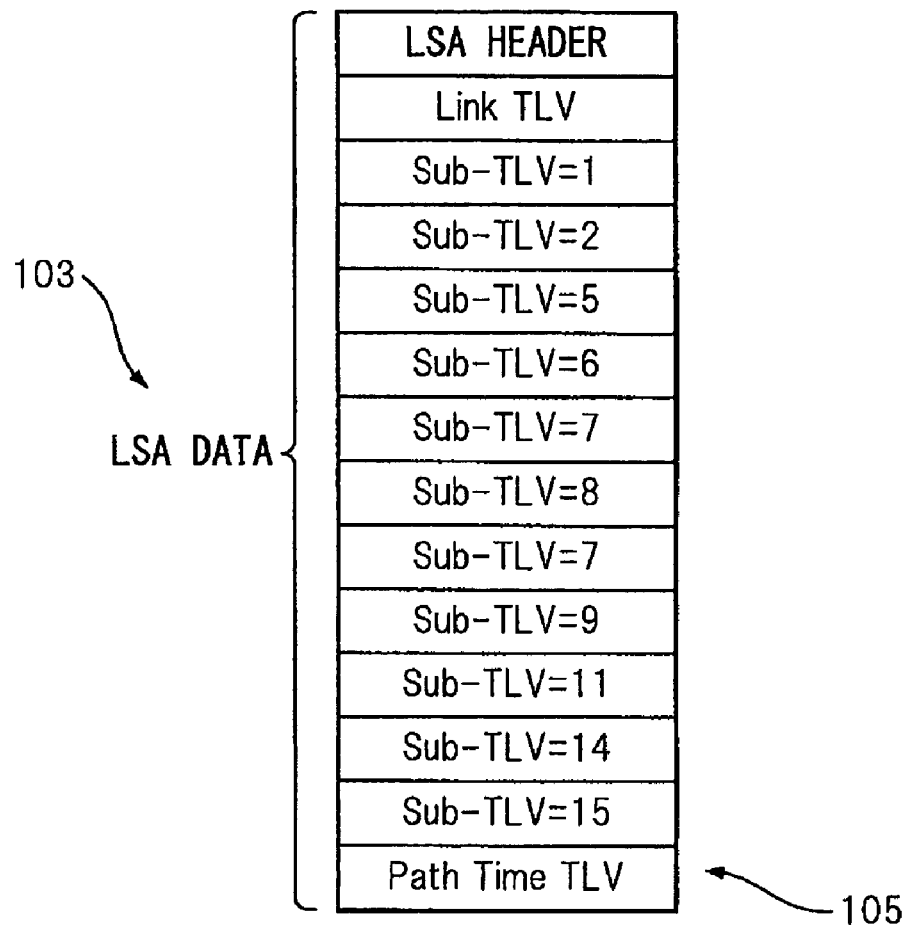
FIG. 16A is a diagram showing a first example of LSA data having the path setup time as SubTLV information.
FIG. 16B is a diagram showing the data structure of Path Time TLV depicted in FIG. 16A.

Alternatively, the path setup time registering unit 56 may register the path setup time measured at each of the nodes N1 to N4 into the LSA data 103 provided for each of the links connected to the respective nodes. FIG. 16A is a diagram showing a first example of the LSA data having the path setup time as SubTLV information, and FIG. 16B is a diagram showing the data structure of Path Time TLV 105 depicted in FIG. 16A. FIG. 16A shows the data structure of the LSA data corresponding to one link. As shown, Path Time TLV 105 for storing the path setup time is provided as the SubTLV information in the LSA data 103, and the path setup time and its acquisition time are stored in the Path Time TLV 105.

Referring to FIG. 15A, the node N2 is connected to the respective links via the plurality of interfaces P1 to P3. In this case, if a path is set up along the link L1, for example, the path setup time may differ between the case where the cross connect is set up so as to cross-connect between the interfaces P1 and P2 and the case where the cross connect is set up so as to cross-connect between the interfaces P1 and P3. Accordingly, in the LSA data example depicted in FIG. 17, Path Time TLV is registered for each combination of cross-connected interfaces.

The illustrated example shows the LSA data concerning the links L1 to L3 connected to the node N2 depicted in FIG. 15A: the LSA data 201 for L1 carries TLV 106, which stores the path setup time when the cross connect is set up between the interfaces P1 and P2, and TLV 107, which stores the path setup time when the cross connect is set up between the interfaces P1 and P3; the LSA data 202 for L2 carries TLV 106, which stores the path setup time when the cross connect is set up between the interfaces P1 and P2, and TLV 108, which stores the path setup time when the cross connect is set up between the interfaces P2 and P3; and the LSA data 203 for L3 carries TLV 107, which stores the path setup time when the cross connect is set up between the interfaces P1 and P3, and TLV 108, which stores the path setup time when the cross connect is set up between the interfaces P2 and P3.

The path setup time registering unit 56 refers to a RECORD ROUTE object (indicated at 109 in FIG. 12) contained in the ResvMsg received after passing through the respective nodes. The RECORD ROUTE object, like the ERO object, carries an interface ID where the cross connect is set up at each node for the path being set up, and the path setup time registering unit 56 can acquire the interface ID by referring to the RECORD ROUTE object. Based on this interface ID, it is determined to which interface combination the path setup time of each node stored in the ResvMsg corresponds, and the path setup time thus acquired is registered into the corresponding TLV.

In step S4 of FIG. 10, the reservation completed message processing unit 54 in the start point node receives the Resv Msg returned in response to the PathMsg transmitted in step S3. Then, in steps S5 to S7, the cross connect is set up for the current node, the path setup time is measured, and the acquired path setup time is registered into the LSA management table 36, as in the steps S14, S15, and S17 carried out at the intermediate or endpoint node.

Figure 18:
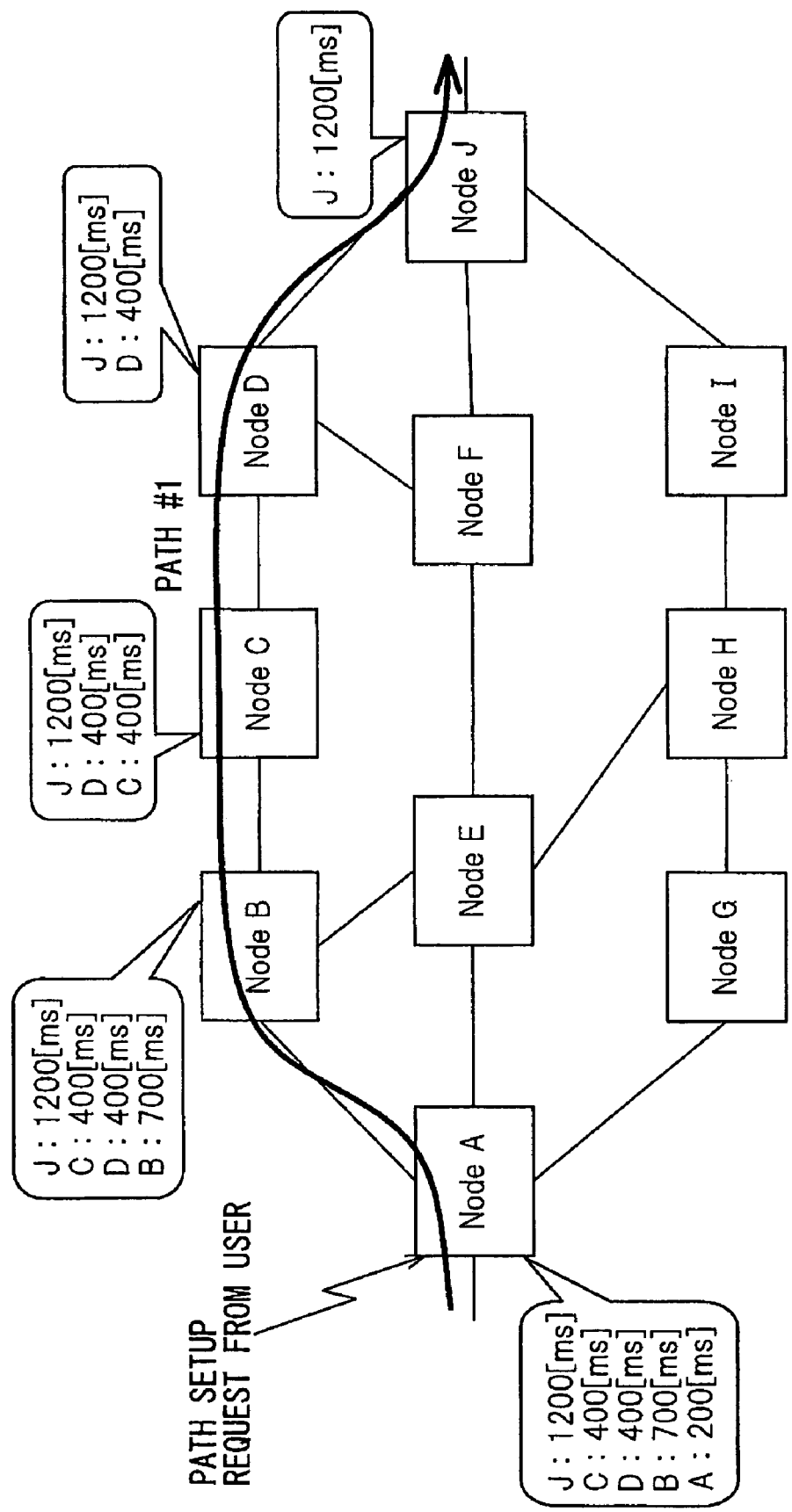
FIG. 18 is a diagram (part 1) for explaining a process for gathering path setup times.
Figure 19:
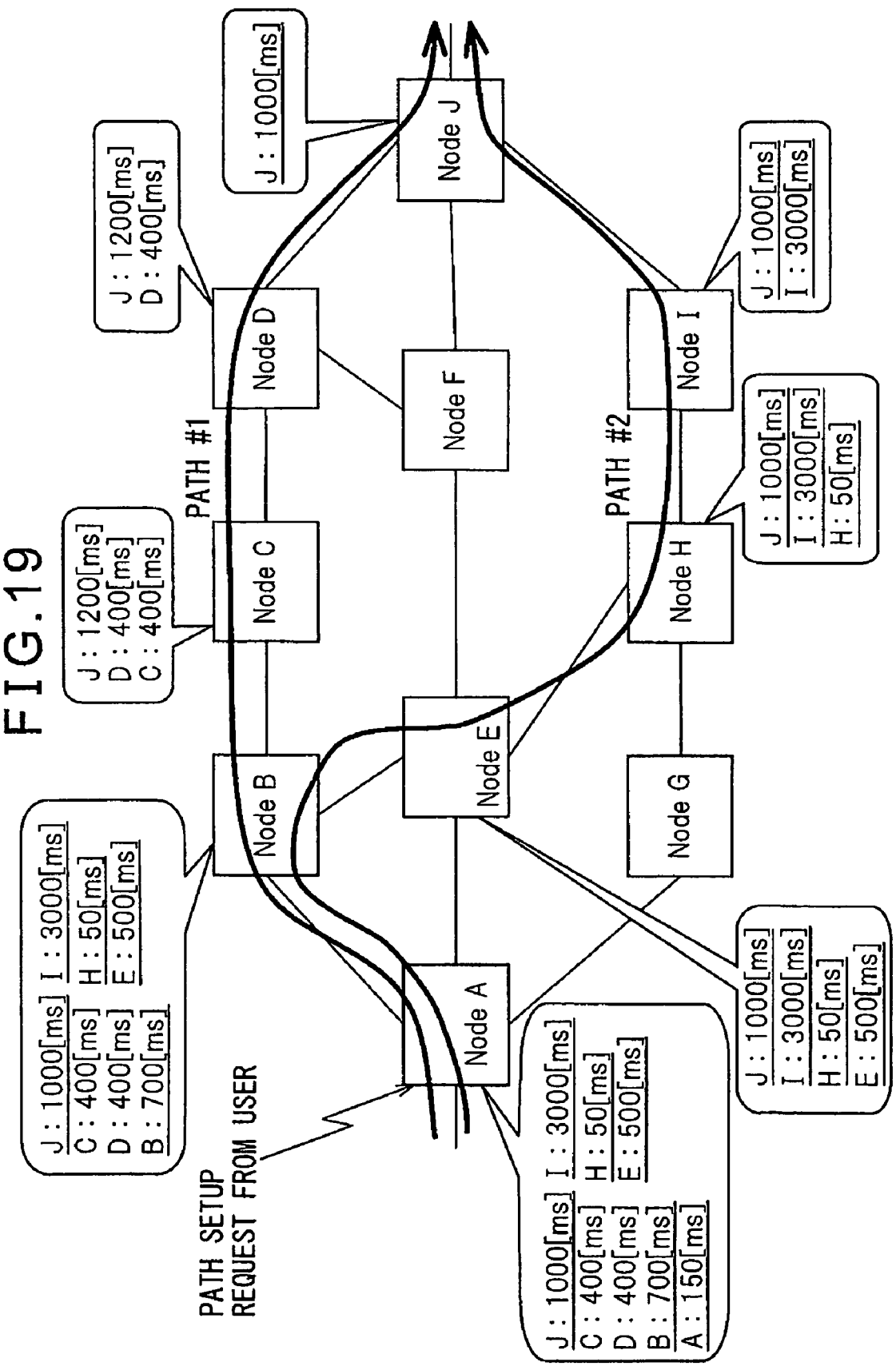
FIG. 19 is a diagram (part 2) for explaining a process for gathering path setup times.

FIGS. 18 and 19 are diagrams explaining how the path setup times are gathered. FIG. 18 shows the path setup time information that can be acquired when the user requests the setup of a path leading from Node A to Node J by passing through nodes B, C, and D in this order (path #1), and FIG. 19 shows the path setup time information that can be acquired for the case of a path passing through A, B, E, H, I, and J in this order (path #2). The underlines are the path setup times updated when the path depicted in FIG. 19 is set up after setting up the path depicted in FIG. 18. As shown, the path setup times of the downstream nodes can be acquired in addition to the path setup time of the current node.

In the illustrated example, the path setup times measured at Node B and Node J and stored in Node A, for example, are updated by the path setup time information measured along the subsequently set up path #2. In this case, at Node A, the topology information generated or advertised by each node whose path setup time information is to be updated is retrieved from among the LSAs, i.e., the topology state showing the network state, stored in the LSA management table 36 maintained at each node, and the path setup time (path time) is set in the retrieved LSA.

Referring to FIGS. 18 and 19, the path setup times of Node F and Node G are not yet gathered at Node A. In this way, the path setup times of all the nodes in the network are not always gathered by the user path setup request alone. Furthermore, the load conditions of each node change from moment to moment; therefore, it is desirable to gather the path setup time of each node periodically. In view of this, in order to receive the ResvMsg containing the path setup time measured at a designated node apparatus registered in the topology information stored in the LSA management table 36, the test path setup unit 57 sets up a test path containing the designated node apparatus.

Figure 20:
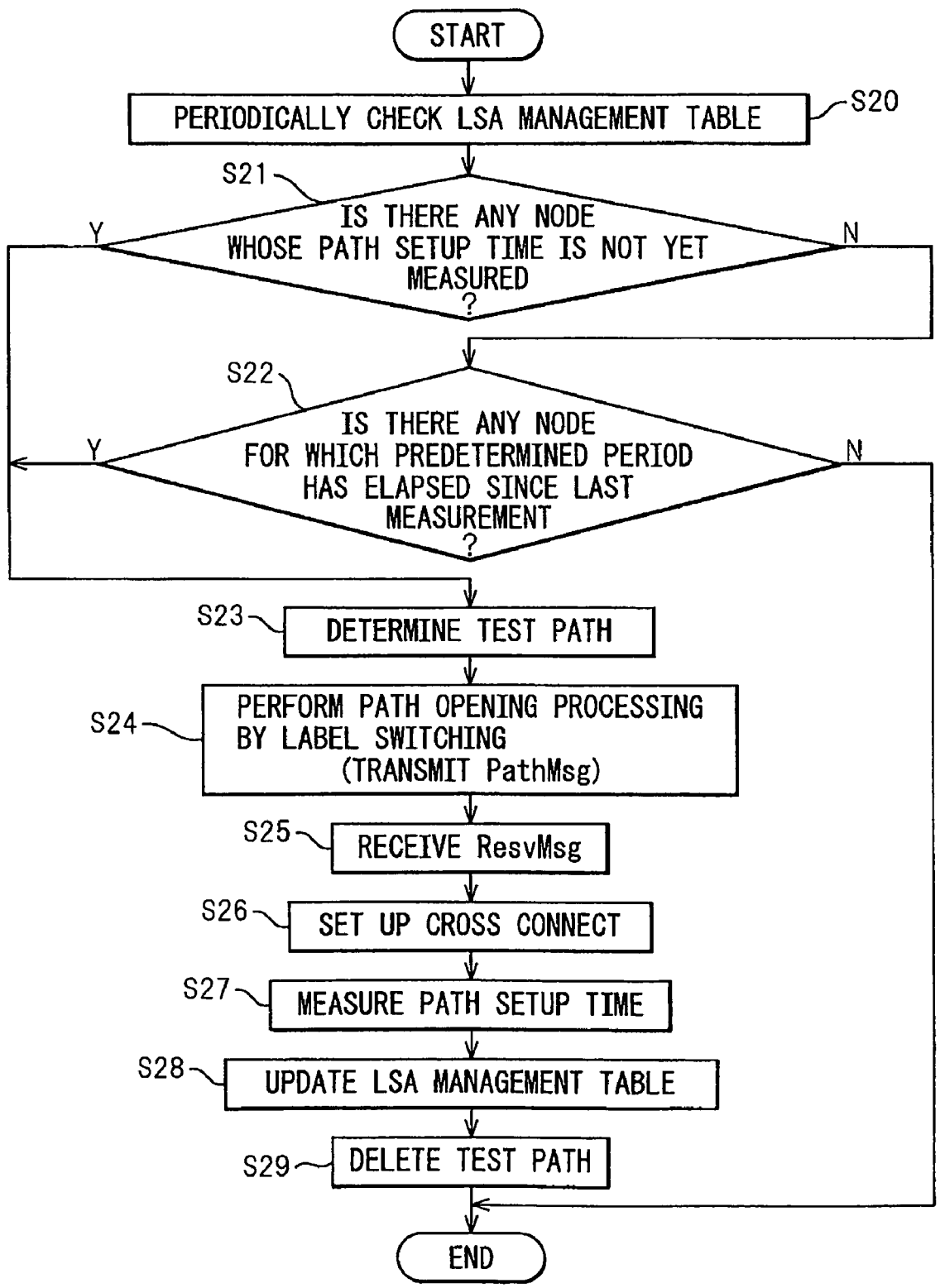
FIG. 20 is a flowchart illustrating a process for gathering path setup times by a test path.

FIG. 20 is a flowchart illustrating a process for gathering the path setup times by a test path.

In step S20, the test path setup unit 57 checks the LSA information of each node stored in the LSA management table 36. In step S21, the test path setup unit 57 detects whether there is any node whose path setup time information is not yet gathered in the LSA information stored in the LSA management table 36. In step S22, the test path setup unit 57 detects whether there is any node for which a predetermined period has elapsed since the last acquisition of its path setup time information.

Figure 21:
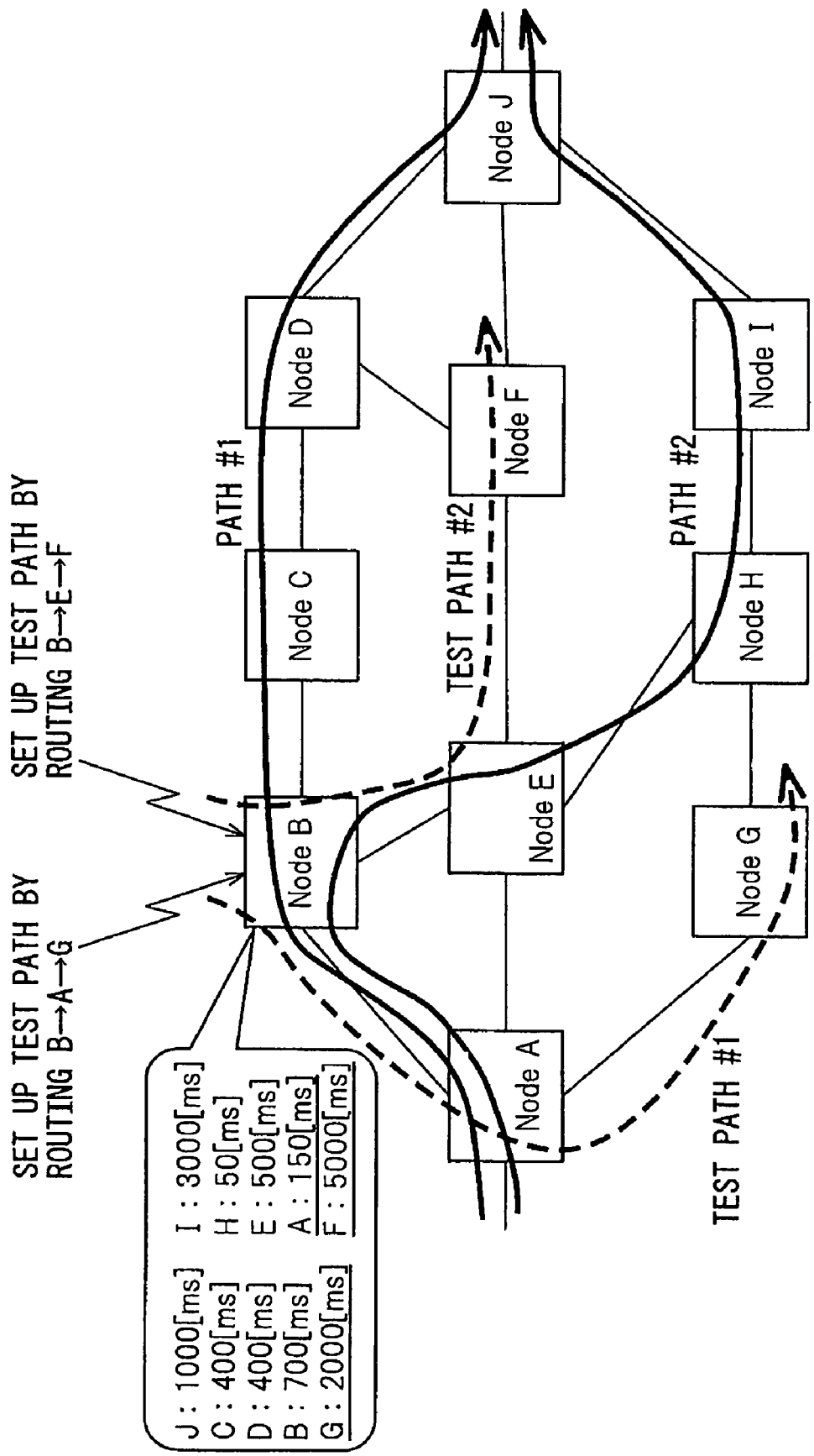
FIG. 21 is a diagram for explaining a process for gathering path setup times by a test path.

FIG. 21 is a diagram for explaining the process for gathering the path setup times by a test path. In the example of FIG. 21, after setting up the paths depicted in FIGS. 18 and 19, Node A, Node F, and Node G are detected as the nodes whose path setup times are not yet gathered in the LSA management table 36 maintained at Node B.

In step S23, the test path setup unit 57 determines a test path containing the nodes detected in step S21 or S22.

In step S24 to S28, path opening processing is performed, the cross connect is set up for the current node, the path setup time is measured, and the acquired path setup time is registered into the LSA management table 36, as in the steps S4 to S7 shown in FIG. 10. In the example depicted in FIG. 21, a test path #2 leading to Node F by passing through nodes B and E in this order and a test path #1 leading to Node G by passing through nodes B and A in this order are set up, and the path setup times of these nodes are thus gathered at Node B.

Further, by acquiring the path setup time by setting up a test path leading to each node detected in step S22, the most up-to-date path setup time can be acquired.

In step S29 of FIG. 20, the test path setup unit 57 deletes the thus set up test path.

Figure 17:
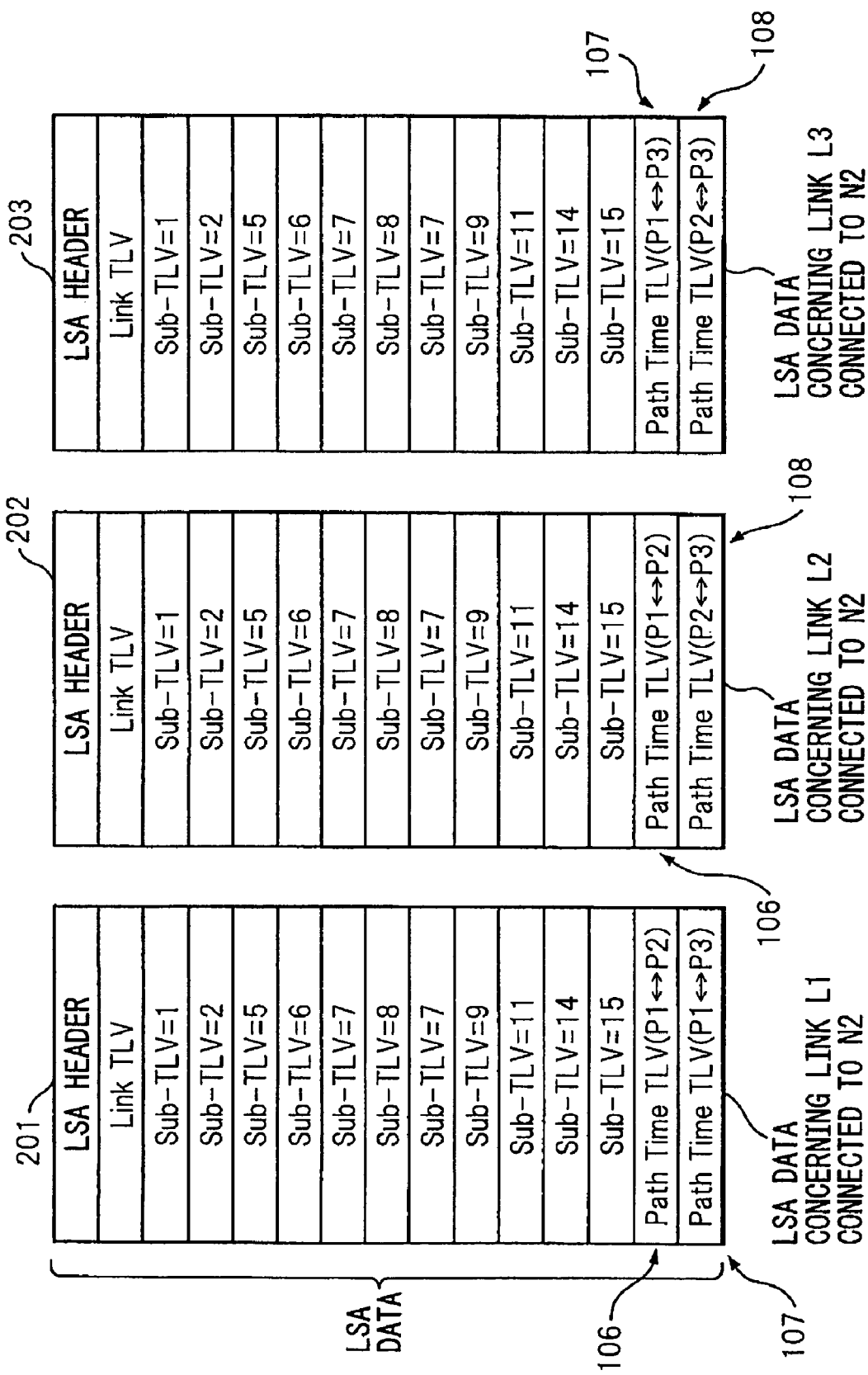
FIG. 17 is a diagram showing a second example of LSA data having the path setup time as SubTLV information.

Referring to FIG. 18, after the path #1 is set up, Node C acquires the path setup times only of Node J, Node D and Node C, but Node A further acquires the path setup times of Node A and Node B. As depicted in FIGS. 16A, 16B, and 17, the path setup times are stored in the respective LSA data, and then are advertised to all other nodes in the network by using a topology advertising function implemented by OSPFTE (Open Shortest Path First Traffic Engineering) or the like; in this way, the path setup times, once measured, can be shared among all the nodes in the network.

Figure 22:
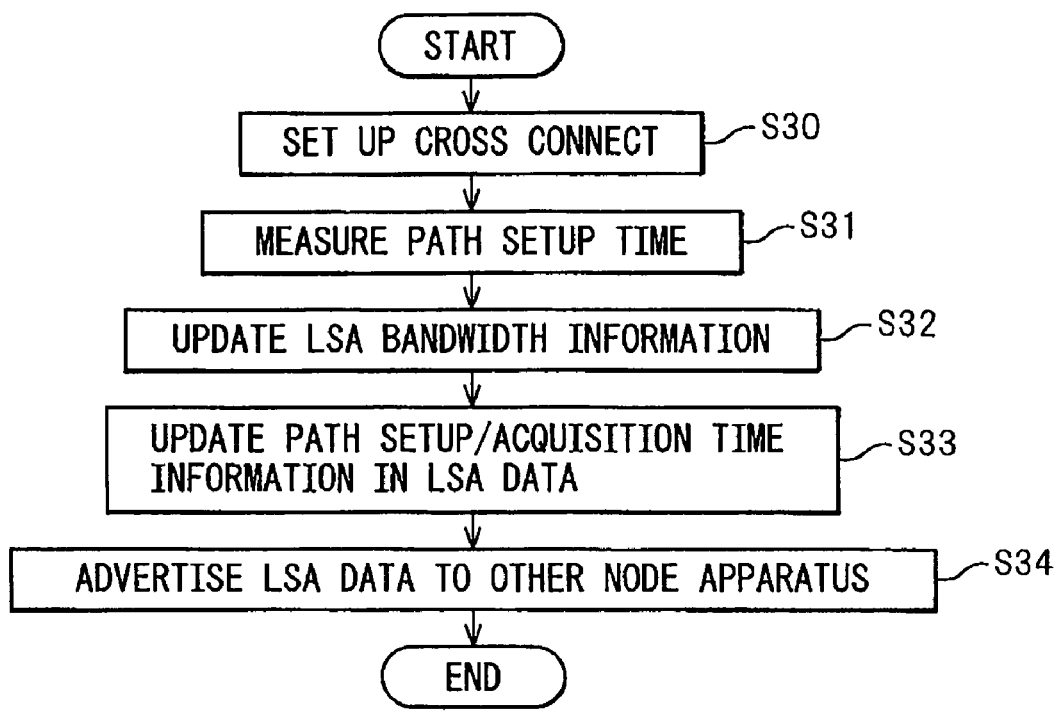
FIG. 22 is a flowchart illustrating a process for advertising the path setup time by including it in LSA.

FIG. 22 is a flowchart illustrating a process for advertising the path setup time by including it in the LSA.

When the cross connect is set up by the cross-connect setup unit 41 in step S30, the path setup time measuring unit 42 measures the time required to set up the cross connect and outputs the path setup time in step S31. Since, at this time, the state of the bandwidth used in the node changes, the bandwidth state information contained in the LSA data is updated (step S32).

In step S33, the path setup time registering unit 56 registers the path setup time of the current node apparatus 10, measured by the path setup time measuring unit 42, as SubTLV information into the LSA data in the LSA management table 36.

In step S34, the LSA transmitter/receiver 37 advertises the LSA data contained in the LSA management table 36 and thus exchanges the LSA information with other node apparatus on the communication network NT1.

Figure 23:
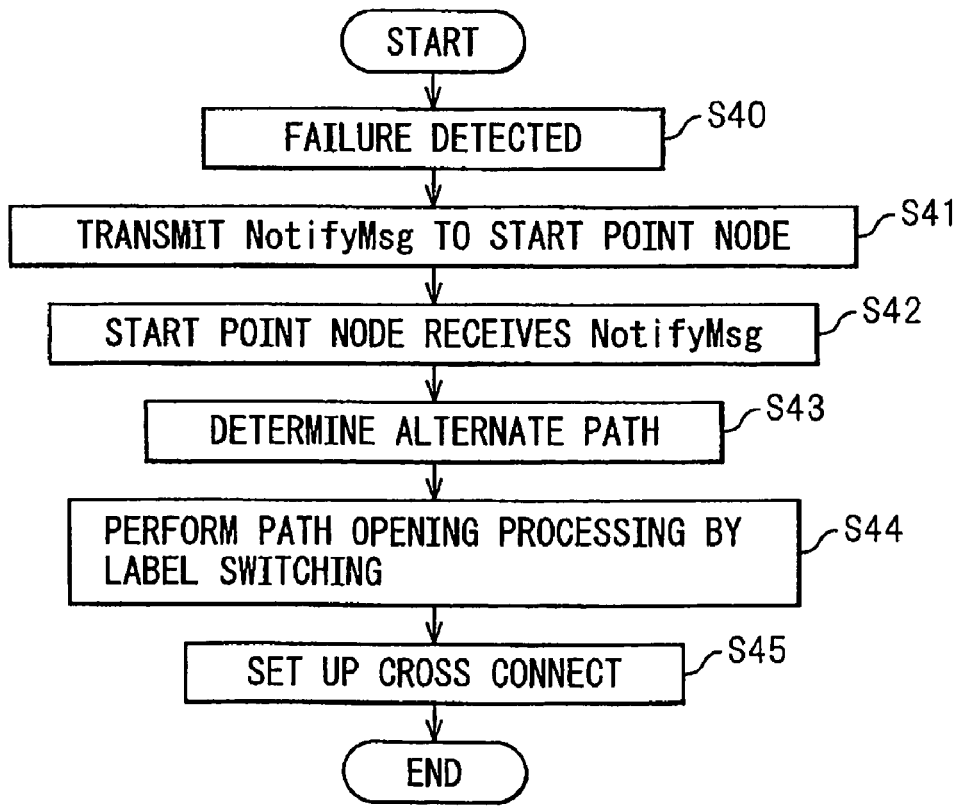
FIG. 23 is a flowchart illustrating a first example of an alternate path setup process.
Figure 24:
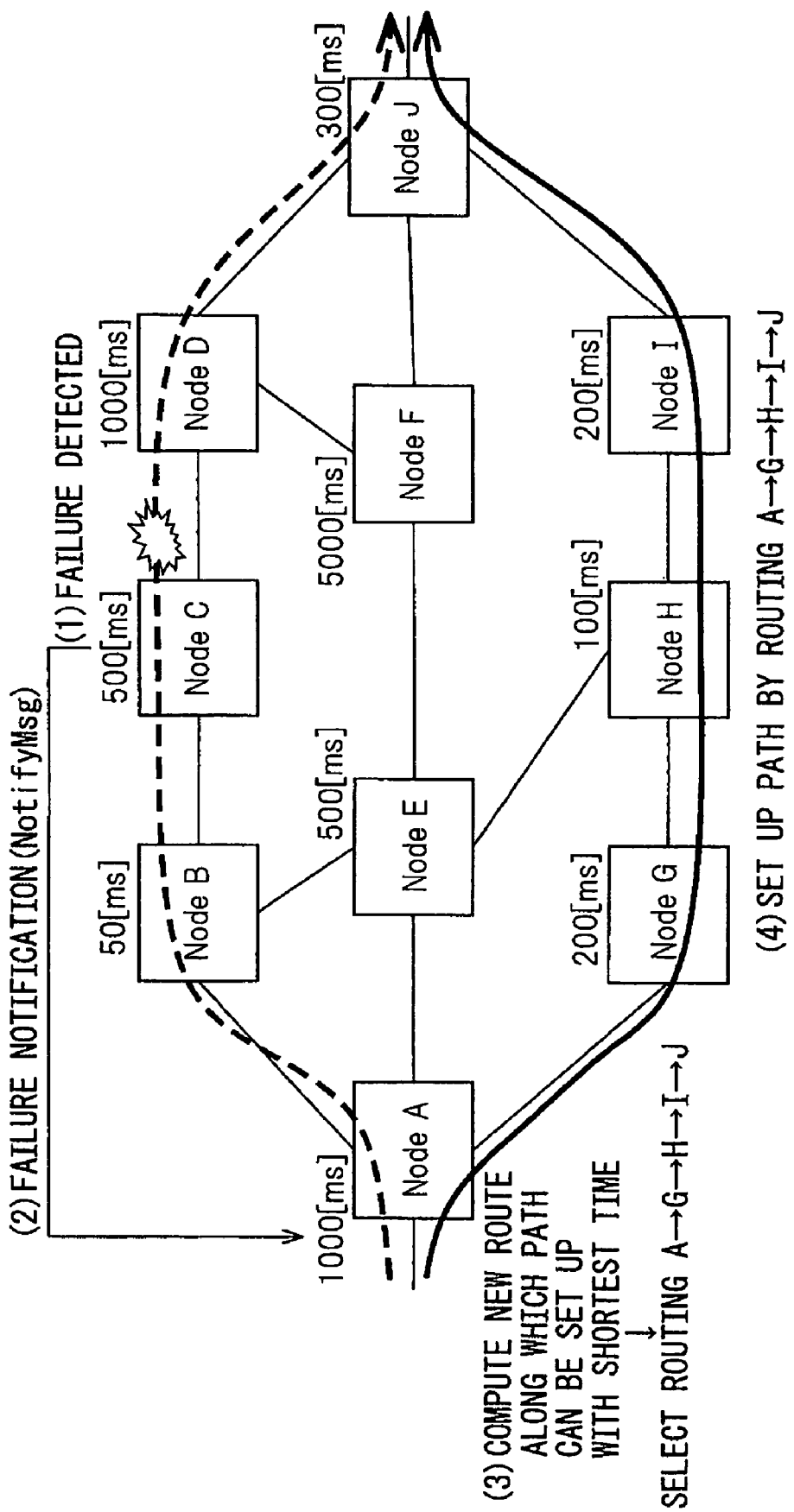
FIG. 24 is a diagram explaining the process illustrated in FIG. 23.

FIG. 23 is a flowchart illustrating a first example of an alternate path setup process. In step S40, the failure detector 24 in the apparatus control unit 11 depicted in FIG. 7 detects the occurrence of a failure on an already established path. FIG. 24 is a diagram explaining the alternate path setup process illustrated in FIG. 23. In the illustrated example, it is assumed that the failure detector 24 in Node C has detected the occurrence of the failure on the already established path which passes through nodes A, B, C, D, and J.

In Node C, the failure detector 24 reports the occurrence of the failure to the failure message processing unit 58 in the label switching controller 32 via the inter-CPU communication controllers 11 and 31. The failure message processing unit 58 identifies Node A as the destination of the NotifyMsg, i.e., the start point node that had requested the failure notification concerning the failed node by using the NOTIFY_REQUEST object, and transmits the NotifyMsg to the destination node (step S41).

When the failure message processing unit 58 in Node A receives the NotifyMsg in step S42, the failure message processing unit 58 identifies the failed path based on the SESSION SENDER TEMPLATE object contained in the Notify Msg.

In step S43, the path determining unit 51 determines an alternate path so as to circumvent the failed part of the path on which the failure was detected. The path determining unit 51 computes the routing of the alternate path based on the path setup time of each node stored in the LSA management table 36, and determines the alternate path by selecting the path that can be set up with the shortest path setup time from among possible paths that circumvent the failed part, i.e., the path for which the sum of the path setup times of all the nodes along the route becomes minimum.

In steps S44 and S45, the alternate path is set up by performing path opening processing in accordance with GMPLS and by setting up the cross connect, as in the steps S2 to S5 shown in FIG. 10.

In the example depicted in FIG. 24, Node A sets up the alternate path from A to J by selecting the path for which the sum of the path setup times becomes minimum (A (1000 ms)→G (200 ms)→H (100 ms)→I (200 ms)→J (300 ms)) based on the path setup times stored in the LSA management table 36.

Figure 25:
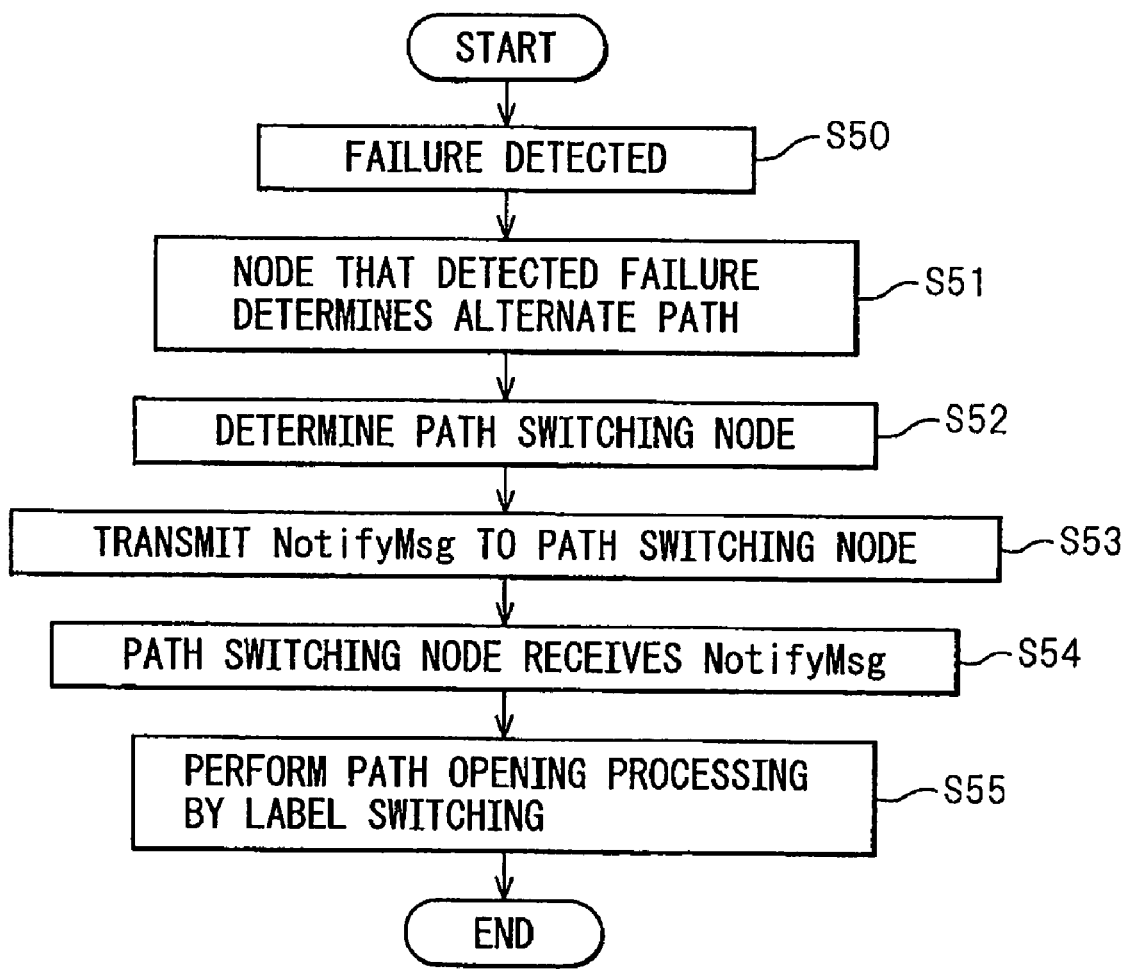
FIG. 25 is a flowchart illustrating a second example of the alternate path setup process.
Figure 26:
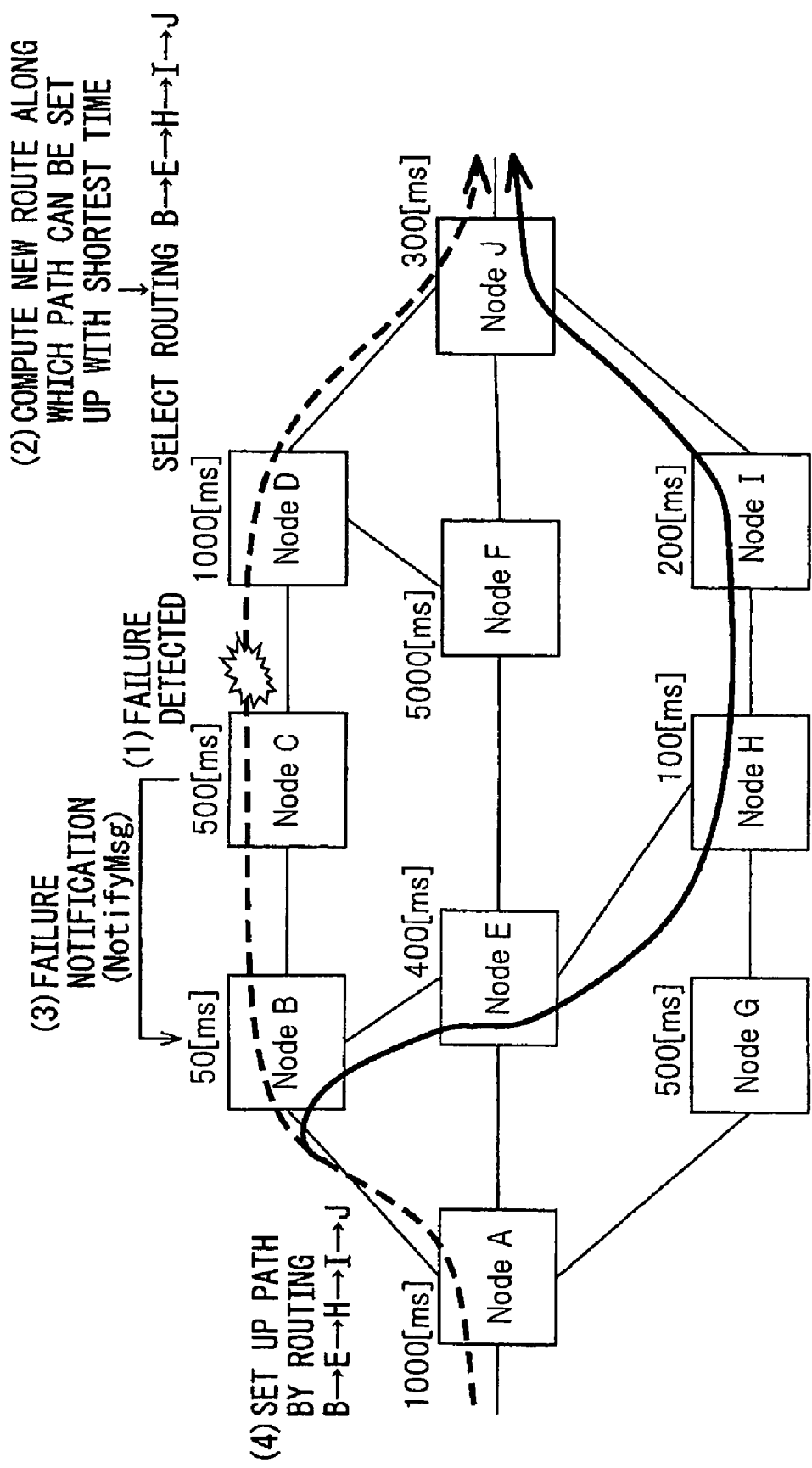
FIG. 26 is a diagram explaining the process illustrated in FIG. 25.

FIG. 25 is a flowchart illustrating a second example of the alternate path setup process. In step S50, the failure detector 24 in the apparatus control unit 11 depicted in FIG. 7 detects the occurrence of a failure on an already established path. FIG. 26 is a diagram for explaining the alternate path setup process illustrated in FIG. 25. In the illustrated example, it is assumed that the failure detector 24 in Node C has detected the occurrence of the failure on the already established path which passes through nodes A, B, C, D, and J. In Node C, the failure detector 24 reports the occurrence of the failure to the path determining unit 51 in the label switching controller 32 via the inter-CPU communication controllers 11 and 31.

In step S51, the path determining unit 51 in Node C determines an alternate path so as to circumvent the failed part of the path on which the failure was detected. The path determining unit 51 computes the routing of the alternate path based on the path setup time of each node stored in the LSA management table 36, and determines the alternate path by selecting the path that can be set up with the shortest path setup time from among possible paths that circumvent the failed part. In the example depicted in FIG. 26, the alternate path from A to J is determined by selecting the path for which the sum of the path setup times becomes minimum (A (1000 ms)→B (50 ms)→E (400 ms)→H (100 ms)→I (200 ms)→J (300 ms)).

In step S52, the path determining unit 51 in Node C selects, from among the nodes contained in both the failed original path and the alternate path, a node at which path opening processing (path setup processing) in accordance with GMPLS is to be performed (hereinafter referred to as the "switching node"). For example, the node located at the point where the alternate path branches off from the original path may be selected as the switching node. In the example depicted in FIG. 26, between Node A and Node B contained in both the original path and the alternate path, Node B at which the alternate path passing through nodes A, B, E, H, I, and J branches off from the original path passing through nodes A, B, C, D, and J, i.e., the node located farthest away from the start point node, is selected as the switching node.

In step S53, the failure message processing unit 58 in Node C transmits the NotifyMsg to the switching node. In this case, the failure message processing unit 58 transmits the NotifyMsg by including therein the alternate path routing information indicating the alternate path determined by the path determining unit 51.

As the format of the object for including the alternate path routing information in the NotifyMsg, use may be made, for example, the format of the EXPLICIT ROUTE object used in the PathMsg, etc.

Figure 27:
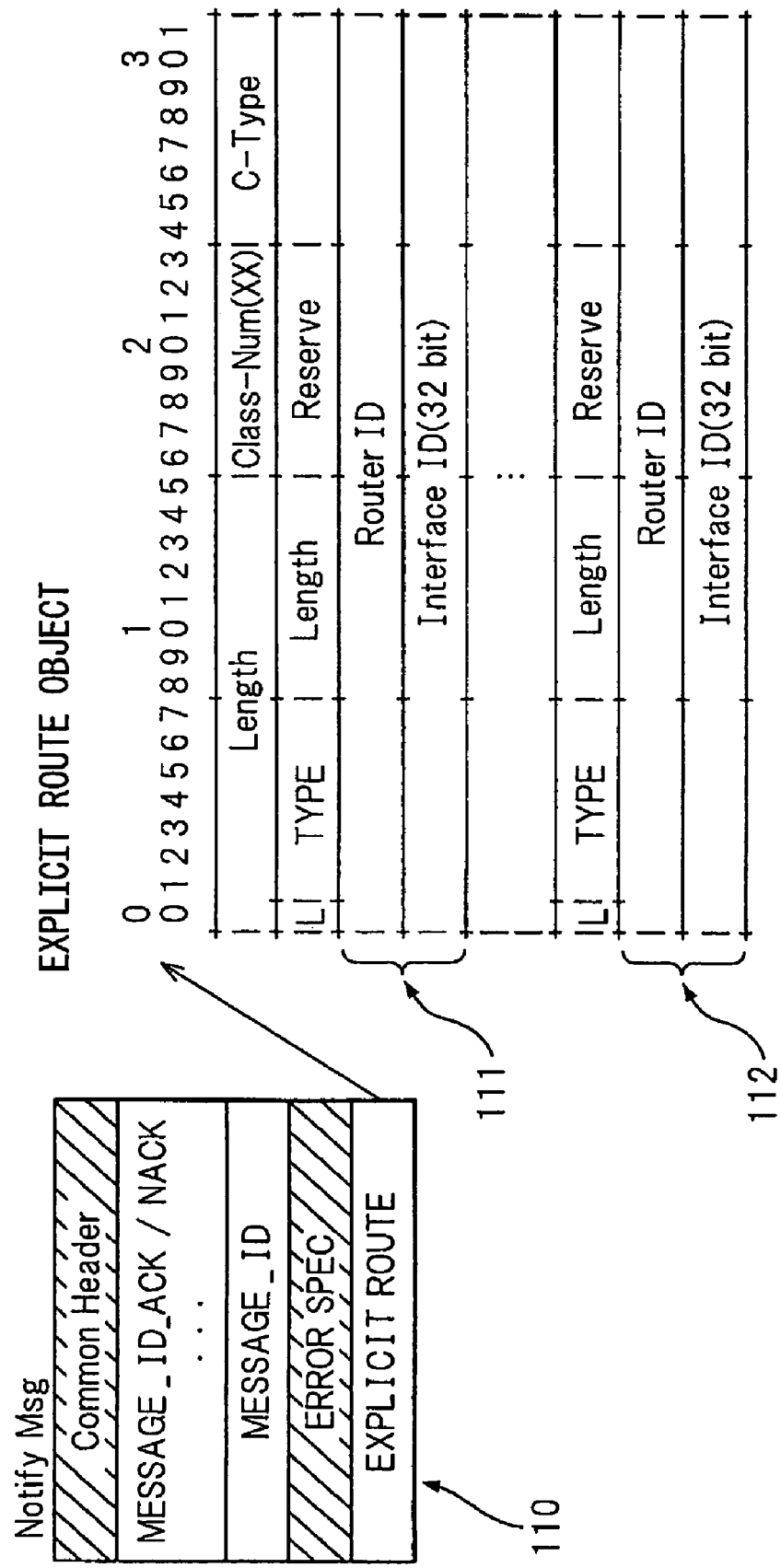
FIG. 27 is a diagram showing the data structure of a Notify Msg that contains alternate path routing information as an ERO object.

FIG. 27 is a diagram showing the data structure of the NotifyMsg that contains the alternate path routing information as the ERO object. The ERO object stores the routing information indicating how the connection is to be routed, and carries a Router ID field indicating the node address and an Interface ID field specifying the link (fiber); when selecting a path that passes through a plurality of nodes, the path is specified by concatenating a plurality of ERO objects.

In the foregoing description, the routing information of the alternate path is specified by providing the ERO object in the NotifyMsg, but any format may be used as long as the object can store the routing information.

When the failure message processing unit 58 in the switching Node B receives the NotifyMsg in step S54, the failure message processing unit 58 identifies the failed path based on the SESSION SENDER TEMPLATE object contained in the NotifyMsg.

In step S55, the path opening processing unit 59 in Node B sets up the alternate path in accordance with GMPLS based on the alternate path routing information stored in the NotifyMsg, in the same manner as the steps S3 to S5 shown in FIG. 10.

According to the apparatus and method disclosed herein, the path can be set up by considering the setup time required to accomplish the path setup at each node apparatus located along the path.

According to the apparatus and method disclosed herein, since there is no need to set up a protection path in advance, efficient path design becomes possible, and the network can be operated with minimum required bandwidth (fiber). Furthermore, in the event of a failure, switching can be accomplished in a short time by preferentially selecting the path that provides the shortest path setup time.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A node apparatus comprising: a computer programmed to determine a path for transferring data in a communication network by:
receiving a reservation request message, requesting a reservation for setting up a path, from a node apparatus located on a start point side of said path;
setting up said path requested by said reservation request message;
measuring path setup time representing time required to set up said path;
including said path setup time in a reservation completed message reporting completion of reservation of said path requested by said reservation request message;
transmitting said reservation completed message to said node apparatus located on the start point side of said path, in response to said reservation request message;

receiving said reservation completed message including path setup time measured at other node apparatus on said communication network;

storing the path setup time measured at each of said other node apparatus on said communication network in a memory; and determining a path that can be set up with a shortest path setup time, based on the path setup time of each node apparatus stored in said memory.

2. A node apparatus as claimed in claim 1, wherein said computer is further programmed to determine said path by:

detecting a failure occurring on a path passing through said node apparatus;

transmitting routing information of the path which is determined so as to circumvent a failed part of said failed path, to any node apparatus through which both said failed path and said determined path pass, when said failure is detected; and performing processing for opening said determined path in accordance with said received routing information, when said routing information is received from another node apparatus that detected a failure.

3. A node apparatus as claimed in claim 1, wherein said computer is further programmed to determine said path by:

detecting a node apparatus whose path setup time is not stored in said memory, and setting up a test path containing said detected node apparatus; and acquiring the path setup time measured at said detected node apparatus whose path setup time is not stored, from the reservation completed message reporting the completion of the reservation for setting up said test path.

4. A node apparatus as claimed in claim 1, wherein said computer is further programmed to determine said path by:

setting up a test path containing a designated one of node apparatus constituting said communication network periodically; and acquiring the path setup time measured at said designated node, from the reservation completed message reporting the completion of the reservation for setting up said test path.

5. A node apparatus as claimed in claim 1, wherein said computer is further programmed to determine said path by advertising said path setup time to other node apparatus by including said path setup time in topology information.

6. A path setup method comprising:

measuring path setup time representing time required to set up a path at each node apparatus on a communication network, when setting up said path for transferring data;

reporting said measured path setup time to other node apparatus on said communication network;

storing the path setup time measured at each of said other node apparatus on said communication network when said measured path setup time which is measured at each of said other node apparatus is reported from said other node apparatus; and determining a path that can be set up with a shortest path setup time, based on the path setup time of each node apparatus that has been stored in advance, wherein any node apparatus located along said path receives a reservation request message, requesting a reservation for setting up said path, from a node apparatus located on a start point side of said path, said any node apparatus sets up said path requested by said reservation request message, and said any node apparatus transmits a reservation completed message reporting completion of reservation of said bath requested by said reservation request message, including the path setup time required to set up said path, to the node apparatus located on the start point side of said path, in response to said reservation request message.

7. A path setup method as claimed in claim 6, wherein a node apparatus that has detected a failure on a path transmits routing information of the path determined so as to circumvent a failed part of said failed path, to any node apparatus through which both said failed path and said determined path pass, and said any node apparatus that received said routing information performs processing for opening said determined path in accordance with said received routing information.

8. A path setup method as claimed in claim 6, wherein any node apparatus on said communication network detects a yet-to-be-measured node apparatus whose path setup time is not yet stored from among other node apparatus, said any node apparatus sets up a test path containing said yet-to-be-measured node apparatus, and said any node apparatus acquires the path setup time measured at said yet-to-be-measured node apparatus from the reservation completed message reporting the completion of the reservation for setting up said test path.

9. A path setup method as claimed in claim 6, wherein any node apparatus on said communication network periodically sets up a test path containing another node apparatus on said communication network, and said any node apparatus acquires the path setup time measured at said other node apparatus from the reservation completed message reporting the completion of the reservation for setting up said test path.

10. A path setup method as claimed in claim 6, wherein any node apparatus on said communication network advertises the path setup time measured at said node apparatus to other node apparatus by including said path setup time in topology information.

* * * * *